(12) United States Patent
Wakita et al.

(10) Patent No.: US 7,144,025 B2
(45) Date of Patent: Dec. 5, 2006

(54) WHEELCHAIR, BRAKE UNIT THEREFOR, AND BRAKE UNIT FOR A MANUALLY-PROPELLED VEHICLE

(75) Inventors: Toyoaki Wakita, Higashiyamato (JP); Takao Nozawa, Kokubunji (JP); Kiyoshi Takagi, Oume (JP)

(73) Assignee: Teac Corporation (JP)

( * ) Notice: Subject to any disclaimer, the term of this patent is extended or adjusted under 35 U.S.C. 154(b) by 153 days.

(21) Appl. No.: 10/971,367

(22) Filed: Oct. 22, 2004

(65) Prior Publication Data

US 2005/0087954 A1    Apr. 28, 2005

(30) Foreign Application Priority Data

Oct. 24, 2003  (JP)  ............................. 2003-364986
Aug. 4, 2004   (JP)  ............................. 2004-228145

(51) Int. Cl.
B62M 1/14   (2006.01)
A61G 5/02   (2006.01)
A61G 5/10   (2006.01)
B60K 28/04  (2006.01)
B62B 5/04   (2006.01)
F16D 55/02  (2006.01)

(52) U.S. Cl. ............................. 280/250.1; 280/304.1; 180/273; 188/2 F; 188/72.1

(58) Field of Classification Search ............ 280/250.1, 280/304.1; 180/273, 907; 188/1.11 E, 19, 188/20, 2 F, 109, 72.1, 156, 158, 159
See application file for complete search history.

(56) References Cited

U.S. PATENT DOCUMENTS

| 4,320,818 | A |   | 3/1982  | Knoche |                |
|-----------|---|---|---------|--------|----------------|
| 4,623,043 | A | * | 11/1986 | Babilas | ...... 188/2 F |
| 5,203,433 | A | * | 4/1993  | Dugas  | ........ 188/2 F |
| 5,370,408 | A | * | 12/1994 | Eagan  | ...... 280/33.994 |
| 5,706,909 | A | * | 1/1998  | Bevins et al. | ...... 180/273 |
| 5,984,334 | A | * | 11/1999 | Dugas  | ...... 280/250.1 |
| 6,092,824 | A | * | 7/2000  | Ritchie et al. | ...... 280/304.1 |
| 6,347,688 | B1 | * | 2/2002 | Hall et al. | ...... 188/5 |
| 6,431,572 | B1 | * | 8/2002 | Harden et al. | ...... 280/250.1 |
| 6,471,231 | B1 | * | 10/2002 | Hargroder | ...... 280/304.1 |
| 6,688,437 | B1 |   | 2/2004 | Usherovich |  |
| 6,739,610 | B1 |   | 5/2004 | Connors et al. |  |
| 6,863,293 | B1 | * | 3/2005 | Kimura et al. | ...... 280/304.1 |
| 2004/0178025 | A1 | * | 9/2004 | Zweideck | ...... 188/2 F |

FOREIGN PATENT DOCUMENTS

JP  50-035338   3/1975
JP  10-85267    4/1998

* cited by examiner

Primary Examiner—Lesley D. Morris
Assistant Examiner—Marc A. Scharich
(74) Attorney, Agent, or Firm—Anderson Kill Olick, PC

(57) ABSTRACT

A wheelchair is disclosed that includes a seat, a pair of wheels, a detection part indicating the presence or absence of a user on the seat, electric brake units switching between applying braking forces to and releasing braking forces from the wheels based on control signals, and a control part connected to the detection part and the electric brake units and outputting the control signals to the electric brake units. The control signals include a first control signal causing the braking forces by the electric brake units to be applied to the wheels and a second control signal causing the braking forces by the electric brake units to be released therefrom. The first control signal is output when the detection part indicates the absence of the user on the seat, and the second control signal is output when the detection part indicates the presence of the user on the seat.

7 Claims, 17 Drawing Sheets

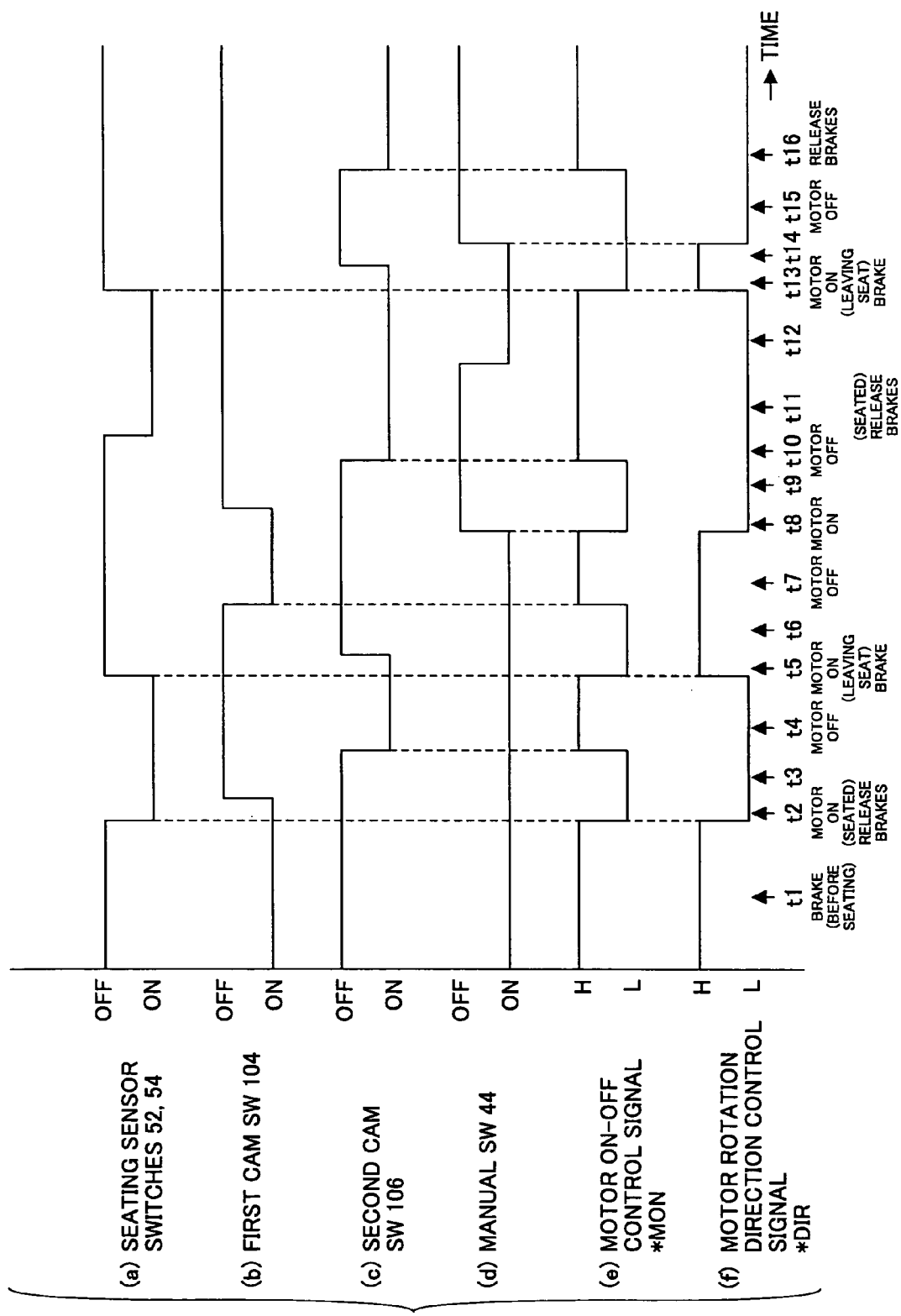

FIG.9

| TIME | STANDING /SEATED | SENSOR SWITCHES 52,54 | FIRST CAM SW 104 | SECOND CAM SW 106 | MANUAL SW 44 | EXOR 1 | EXOR 2 | AND 1 | AND 2 | AND 4 | AND 5 | *MON | *DIR AND3 |
|---|---|---|---|---|---|---|---|---|---|---|---|---|---|
| t1 | STANDING | H | L | H | L | H | H | H | L | H | L | H | H |
| t2 | SEATED | L | L | H | L | L | H | L | L | L | L | L | L |
| t3 | SEATED | L | H | H | L | H | L | H | H | L | L | L | L |
| t4 | SEATED | L | H | L | L | H | H | L | H | H | L | H | L |
| t5 | STANDING | H | H | H | L | H | L | L | L | L | L | L | H |
| t6 | STANDING | H | H | H | H | H | H | H | L | H | L | H | H |
| t7 | STANDING | H | L | H | H | L | L | L | L | L | L | L | L |
| t8 | STANDING | H | L | L | H | H | H | H | H | L | H | H | L |
| t9 | STANDING | H | L | L | L | H | H | H | H | H | H | H | L |
| t10 | STANDING | H | H | L | L | L | H | L | H | H | L | L | L |
| t11 | SEATED | L | H | H | L | L | L | L | L | L | L | L | L |
| t12 | SEATED | L | H | H | H | L | H | L | L | L | L | L | L |
| t13 | STANDING | H | H | H | L | L | H | L | L | H | L | H | H |
| t14 | STANDING | H | H | L | H | L | L | L | H | L | L | H | H |
| t15 | STANDING | H | H | H | L | L | H | L | L | L | L | L | L |
| t16 | STANDING | H | H | L | H | L | H | L | H | L | H | H | L |

WHEELCHAIR, BRAKE UNIT THEREFOR, AND BRAKE UNIT FOR A MANUALLY-PROPELLED VEHICLE

BACKGROUND OF THE INVENTION

1. Field of the Invention

The present invention relates generally to wheelchairs, brake units therefor, and brake units for manually-propelled vehicles, and more particularly to a brake unit that is attached to a manual wheelchair or a manually-propelled vehicle so as to increase its safety when a person leaves or sits down on its seat, and a wheelchair including such a brake unit.

2. Description of the Related Art

Normally, a manual brake unit is provided on each of the right and left sides of a manual wheelchair. The manual brake units are provided in front of corresponding right and left rear wheels, and enter in a braking state to brake the rear wheels or in a brake releasing state to release the brakes, depending on the operation position of an operating lever.

For instance, when a user (a care receiver) seated on the seat of the wheelchair rises from the seat, the user is required to stand up after moving the operating lever of the manual brakes provided on the right and left sides so that the brakes enter the braking state to apply braking forces to the rear wheels immediately before leaving the seat.

Some users of such conventional wheelchairs, such as elderly persons with cerebrovascular disease who are extremely forgetful, forget to apply brakes on and stand up from a wheelchair.

Therefore, for instance, when a user such as an elderly person or a disabled person forgets to move the operating lever to the braking position, and touches the frame of a wheelchair to try to sit down thereon again after leaving the wheelchair, the wheelchair may start to move in an unexpected direction since no brakes are applied to the wheelchair. Thus, if a wheelchair moves as a user sits down thereon, the user may lose a body balance so as to totter or tumble.

In order to solve the above-described problem, a wheelchair with a brake mechanism that automatically applies brakes on the wheelchair when a user rises therefrom has been proposed.

For instance, Japanese Patent No. 3103775 discloses a brake unit including a lever provided rotatably under the seat of a wheelchair so as to receive a load imposed when a user is seated on the wheelchair, and a transmission mechanism that is caused to operate by the rotation of the lever so as to pull a brake wire, thereby releasing brakes while the user remains seated on the seat.

In the case of providing a lever mechanism that operates by receiving a load under a seat as described above, for instance, there is a problem in that the lever mechanism under the seat may prevent the wheels on both sides of a manual wheelchair, which are foldable in such directions as to approach each other, from being folded.

Further, a user sits down on the seat to press down the lever by her/his weight. Accordingly, while the user is being seated, the end of the lever remains in contact with the buttocks of the user. As a result, the user may feel discomfort.

SUMMARY OF THE INVENTION

Accordingly, it is a general object of the present invention to provide a wheelchair, a brake unit therefor, and a brake unit for a manually-propelled wheelchair in which one or more of the above-described disadvantages are eliminated.

A more specific object of the present invention is to provide a brake unit that is easily attachable to a conventional manual wheelchair and manually-propelled vehicle so as to ensure the safety of its user with simple structure, and a wheelchair including such a brake unit.

The above objects of the present invention are achieved by a wheelchair including: a seat; a pair of wheels provided on first and second sides of the seat; a detection part configured to indicate presence or absence of a user on the seat; a pair of electric brake units configured to switch between applying braking forces to and releasing braking forces from the wheels based on control signals; and a control part connected to the detection part and the electric brake units, the control part being configured to output the control signals to the electric brake units, the control signals including a first control signal causing the braking forces by the electric brake units to be applied to the wheels and a second control signal causing the braking forces by the electric brake units to be released from the wheels, the first control signal being output when the detection part indicates the absence of the user on the seat and the second control signal being output when the detection part indicates the presence of the user on the seat.

The above objects of the present invention are also achieved by a brake unit for a wheelchair, including: a brake member operable to switch between applying braking forces to and releasing braking forces from a wheel of the wheelchair; a driving part configured to drive the brake member to a braking position; a detection part configured to indicate presence or absence of a user on a seat of the wheelchair; and a control part connected to the detection part and the driving part, the control part being configured to control the driving part so that when the detection part indicates the absence of the user on the seat, the driving part transmits a driving force to the brake member to apply the braking forces to the wheel, and when the detection part indicates the presence of the user on the seat, the driving part stops the driving force to release the brake forces from the wheel.

The above objects of the present invention are also achieved by a brake unit for a manually-propelled vehicle, the brake unit being attached near one side of a wheel of the manually-propelled vehicle, the brake unit including: a fixing member attached to a frame of the manually-propelled vehicle so as to oppose an inside of the wheel; a first rotating member attached to the fixing member so as to be rotatable in a first direction in which the wheel moves; a first brake member supported by the first rotating member; a second rotating member attached to the fixing member so as to be rotatable in a second direction in which the wheel moves, the second direction being opposite to the first direction; a second brake member supported by the second rotating member; an urging member configured to urge the first and second rotating members so that the first and second brake members are pressed in a direction to come into contact with the wheel; and a brake releasing part configured to drive the first and second rotating members against an urging force of the urging member so that the first and second brake members are moved away from the wheel.

According to the present invention, a necessary and sufficient braking force can be applied, with a simple configuration, to a manual wheelchair when a user stands up therefrom, thus ensuring, for instance, that the user is prevented from losing a body balance to totter or tumble in sitting down on the seat. Further, the brake unit according to the present invention is not only retrofittable to today's most widely used existing folding manual wheelchairs with ease, but also attachable so as not to hinder the folding of the wheelchair. Further, a lever is not pressed against the buttocks of the user so as to detect the user seated on the seat. As a result, causing discomfort to the user is prevented.

BRIEF DESCRIPTION OF THE DRAWINGS

Other objects, features and advantages of the present invention will become more apparent from the following detailed description when read in conjunction with the accompanying drawings, in which:

FIG. 8 is a timing chart of the control circuit according to the first embodiment of the present invention;

FIG. 9 is a truth table based on the timing chart of the control circuit shown in FIG. 8 according to the first embodiment of the present invention;

DETAILED DESCRIPTION OF THE PREFERRED EMBODIMENTS

A description is given below, with reference to the accompanying drawings, of embodiments of the present invention.

[First Embodiment]

Figure 1:
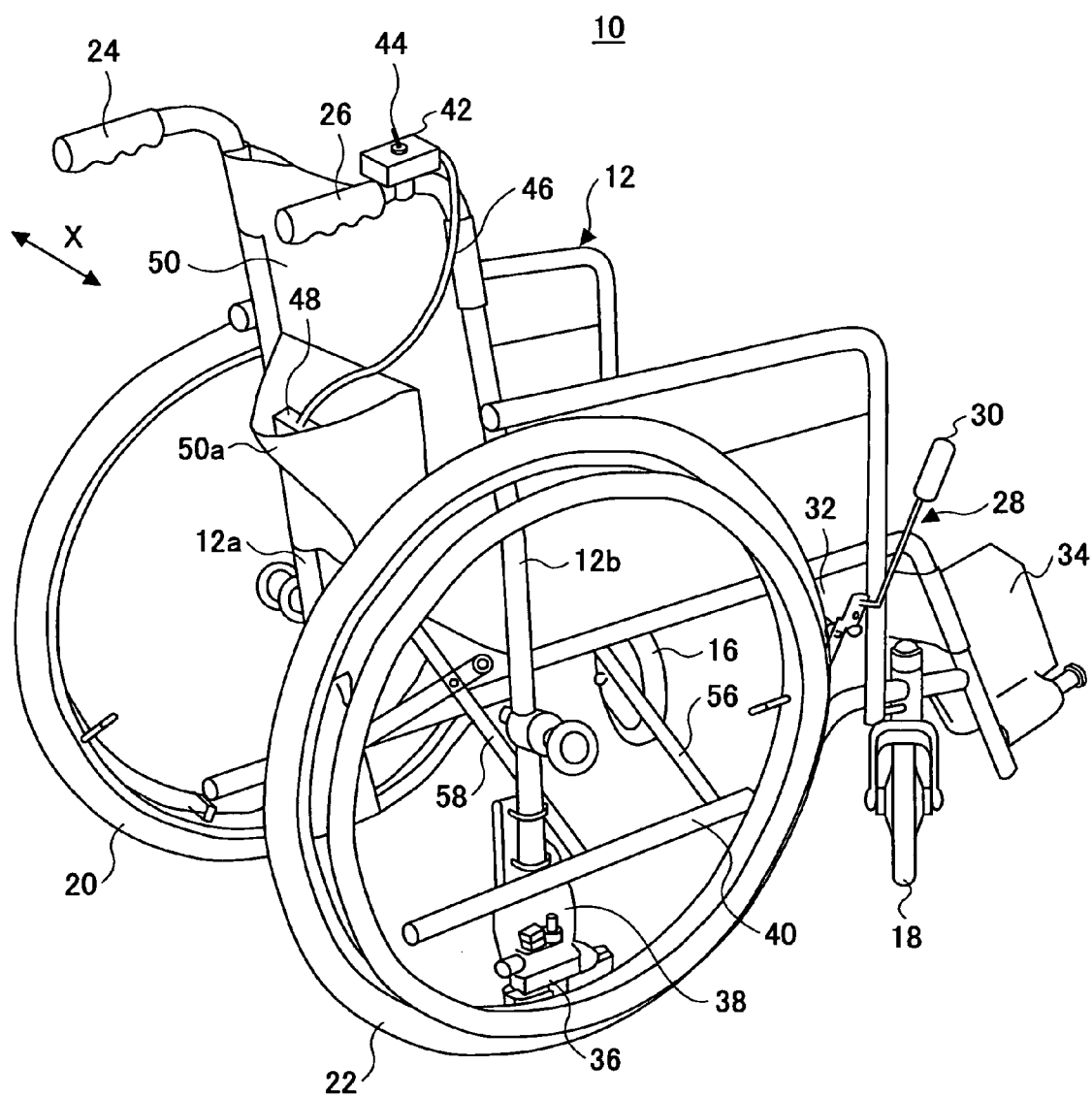
FIG. 1 is an angled rear perspective view of a manually-propelled vehicle according to a first embodiment of the present invention.
Figure 2:
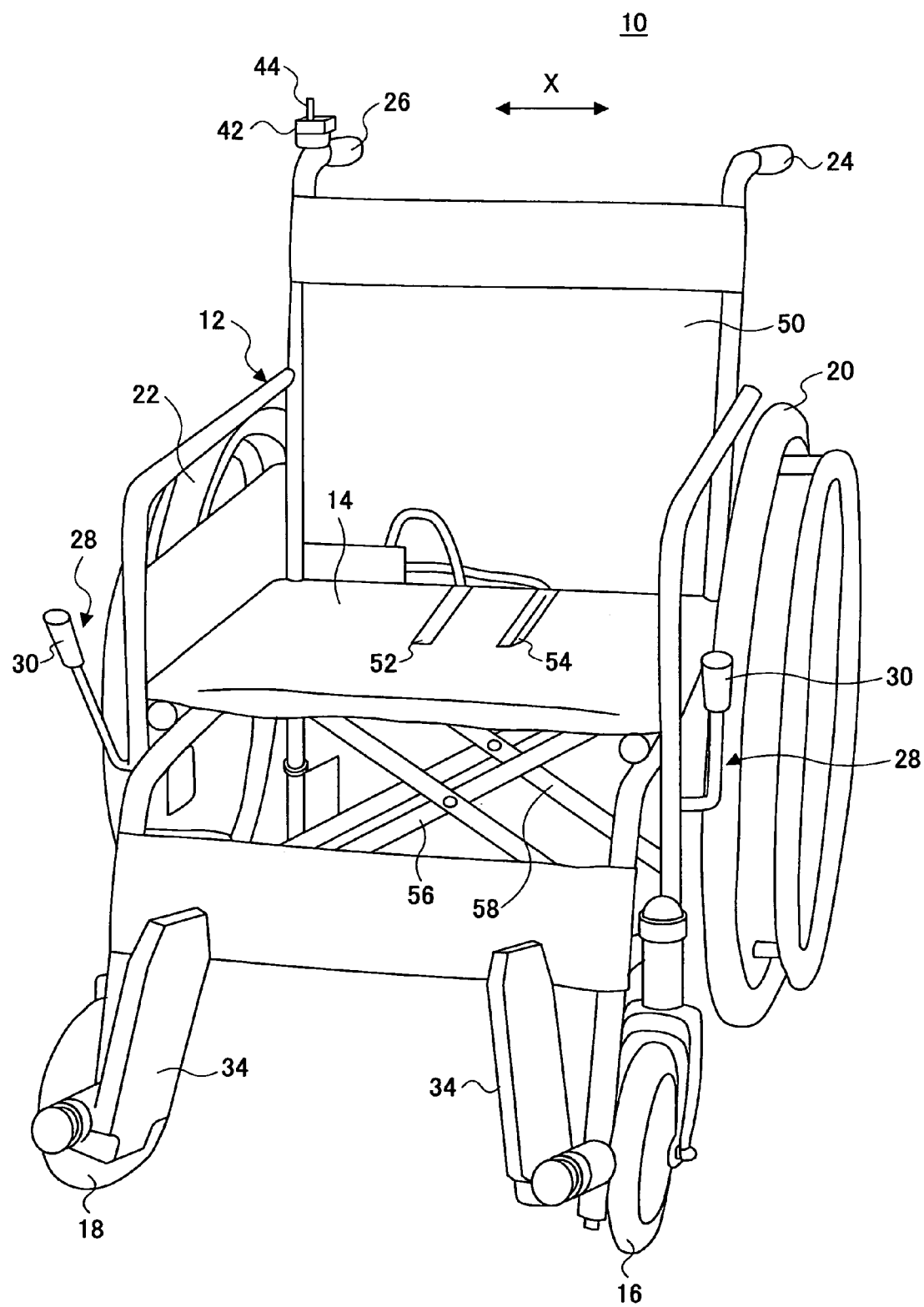
FIG. 2 is a front perspective view of the manually-propelled vehicle according to the first embodiment of the present invention.

FIGS. 1 and 2 are an angled rear perspective view and a front perspective view, respectively, of a manually-propelled vehicle 10 according to a first embodiment of the present invention.

As shown in FIGS. 1 and 2, the manually-propelled vehicle 10, which is a four-wheel manual wheelchair in the illustrated exemplary embodiment, includes a frame 12 composed of metal pipes and a cloth seat 14 provided across the frame 12. Further, the manually-propelled vehicle 10 (hereinafter referred to as "wheelchair 10") includes small-diameter front wheels 16 and 18 on the front side of the frame 12 and large-diameter rear wheels 20 and 22 on the respective left and right sides of the rear part of the frame 12. The front wheels 16 and 18 are provided to rotate freely so as to face a direction in which the wheelchair 10 moves.

The wheelchair 10 includes push handles 24 and 26 so that a caregiver can push the wheelchair 10 from behind. Further, the wheelchair 10 includes a pair of manual brake units 28 on both sides of its front part for individually braking the respective rear wheels 20 and 22.

The manual brake units 28 apply braking forces to the rear wheels 20 and 22 when operating levers 30 thereof are brought down forward to engage the engagement parts (not graphically represented) of corresponding brackets 32. When the wheelchair 10 is not in use, the operating levers 30 of the manual brake units 28 are engaged at respective braking positions to brake the corresponding rear wheels 20 and 22. The operating levers 30 are moved to respective brake releasing positions immediately before moving the wheelchair 10.

A pair of steps 34 on which a user (care receiver) may put her/his feet when the user is seated on the seat 14 are provided in front of the front wheels 16 and 18.

An electric brake unit 36 is provided inside each of the rear wheels 20 and 22. Each electric brake unit 36 is supported by a bracket 38. The brackets 38 are held by corresponding lower-part members 40 fixed to the lower ends of rear supports 12a and 12b of the frame 12.

As described below, each electric brake unit 36 is caused by corresponding control signals supplied from a control circuit 108 (FIG. 6) to switch between a braking mode to apply a braking force to the corresponding rear wheel 20 or 22 and a brake releasing mode to release the braking force applied thereon.

A manual operations part 42 for the care receiver to switch on or off the electric brake units 36 is provided to the push handle 26. The manual operations part 42 includes a manual switch 44, and is connected to a control box 48 via a cable 46. The control box 48 is contained in a pocket 50a provided to a back part 50 of the wheelchair 10.

Seating sensor switches 52 and 54 are attached to the seat 14 in order to detect the seating of the user. Each of the seating sensor switches 52 and 54 includes, for instance, a membrane switch composed of layers of flexible, film-like resin substrates. Each of the seating sensor switches 52 and 54 closes and outputs a detection signal when a load (weight) is applied thereto. Since the seating sensor switches 52 and 54 are thin and flexible, the seating sensor switches 52 and 54 do not cause discomfort to the user when the user is seated on the seat 14. The seating sensor switches 52 and 54 are provided in parallel so that the detection signal can be output to the control box 48 when either one of the seating sensor switches 52 and 54 is switched on.

Since the seat 14 is provided with only the seating sensor switches 52 and 54, the seat 14 can be extended and contracted along the directions indicated by arrow X in FIGS. 1 and 2 by rotating X-shaped connecting members 56 and 58 connecting the frame 12 and the lower-part members 40. The state shown in FIG. 2 is a "normal use" or usable state where the seat 14 is extended laterally so that the user can be seated thereon. When the X-shaped connecting members 56 and 58 are rotated so as to move the rear wheels 20 and 22 close to each other so that the wheelchair 10 enters a storage or unused state in which the seat 14 is folded, the seating sensor switches 52 and 54 do not get in the way or obstruct such movement.

Next, a description is given in detail of an exemplary configuration of the electric brake unit 36.

Figure 3:
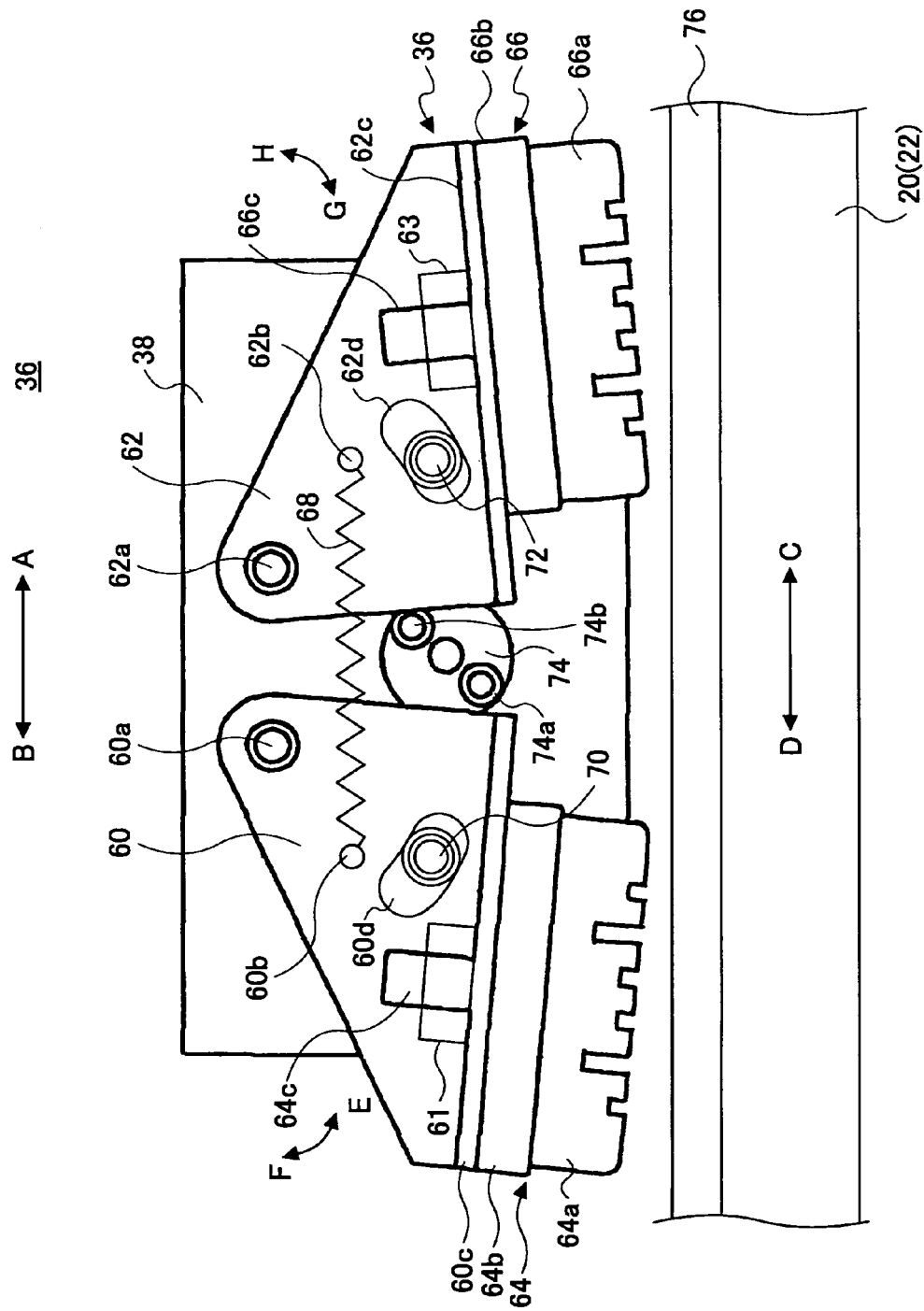
FIG. 3 is an enlarged bottom view of an electric brake unit in a brake releasing state according to the first embodiment of the present invention.
Figure 4:
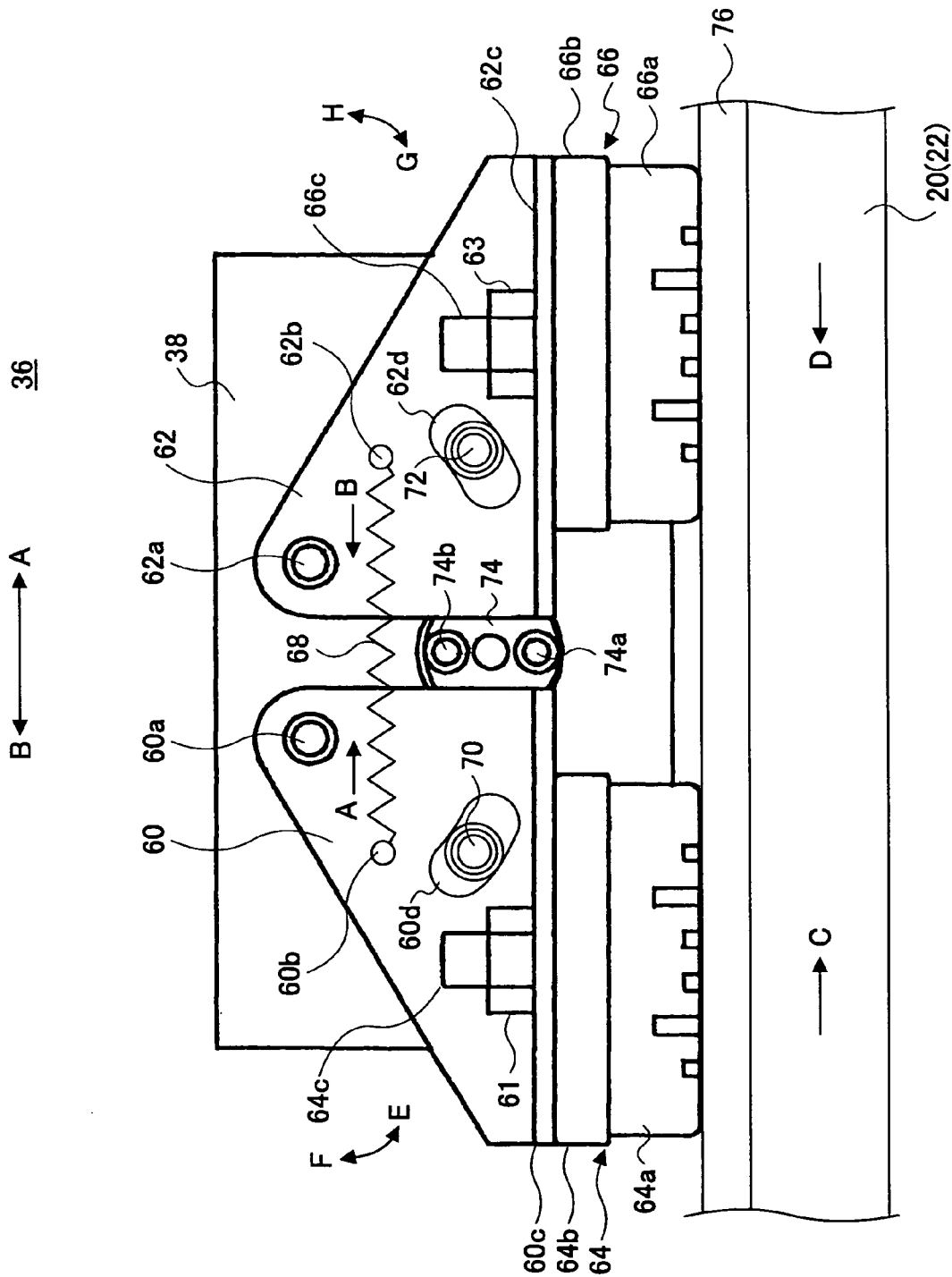
FIG. 4 is an enlarged bottom view of the electric brake unit in a braking state according to the first embodiment of the present invention.

FIG. 3 is an enlarged bottom view of the electric brake unit 36 in a brake releasing state. FIG. 4 is an enlarged bottom view of the electric brake unit 36 in a braking state.

Referring to FIG. 3, when the wheelchair 10 is moved, the electric brake unit 36 operates in the brake releasing state. As shown in FIGS. 3 and 4, the electric brake unit 36 includes a first rotating member 60 supported on the bracket 38 so as to be rotatable in the directions indicated by arrows E and F, a second rotating member 62 supported on the bracket 38 so as to be rotatable in the directions indicated by arrows G and H, a first brake member 64 fixed to the first rotating member 60, a second brake member 66 fixed to the second rotating member 62, an urging member 68 (such as the illustrated coil spring) that urges the first and second rotating members 60 and 62 so as to approach each other, a driving cam (a brake releasing part) 74 intervening between the first and second rotating members 60 and 62 so as to rotate to release braking forces, and a drive mechanism 91 (FIG. 5) driving the driving cam 74.

The first rotating member 60 is supported so as to be rotatable about a shaft 60*a*, and its rotation range is restricted by a pin 70 fitted into an arcuate hole 60*d*. The second rotating member 62 is supported so as to be rotatable about a shaft 62*a*, and its rotation range is restricted by a pin 72 fitted into an arcuate hole 62*d*. The coil spring 68 or other suitable urging member has one end thereof engaging an engagement pin 60*b* of the first rotating member 60 and the other end thereof engaging an engagement pin 62*b* of the second rotating member 62.

Accordingly, the coil spring 68 urges the first rotating member 60 in the E direction and the second rotating member 62 in the G direction. The distance between the opposing sides of the first and second rotating members 60 and 62 is set to be greater than the diameter of each of paired rollers 74*a* and 74*b* projecting from the driving cam 74.

The driving cam 74 rotates so that one of the rollers 74*a* and 74*b* presses the side of the first rotating member 60 in the direction indicated by arrow B and the other one of the rollers 74*a* and 74*b* presses the side of the second rotating member 62 in the direction indicated by arrow A. As a result, the first and second rotating members 60 and 62 rotate in brake releasing directions to move away from each other.

The first brake member 64 includes a brake shoe 64*a* made of friction material of a high coefficient of friction (such as rubber material), a base 64*b* to which the brake shoe 64*a* is fixed, and a male screw 64*c* fastened to a fixing part 60*c* of the first rotating member 60 with a nut 61. Likewise, the second brake member 66 includes a brake shoe 66*a* made of friction material of a high coefficient of friction (such as rubber material), a base 66*b* to which the brake shoe 66*a* is fixed, and a male screw 66*c* fastened to a fixing part 62*c* of the second rotating member 62 with a nut 63.

In the brake releasing state (FIG. 3), the brake shoes 64*a* and 66*a* of the first and second brake members 64 and 66, respectively, are driven by the rotation of the driving cam 74 so as to oppose the inside circumferential surface or other suitable engagement surface of a rim 76 of the corresponding rear wheel 20 or 22, and operate so that their respective rotationally distal ends are spaced from the rim 76 by a great distance.

As shown in FIG. 4, in the braking state, the driving cam 74 is rotated to a position where the paired rollers 74*a* and 74*b* are prevented from pressing the sides of the first and second rotating members 60 and 62, respectively. The first and second rotating members 60 and 62, which are urged in braking directions to approach each other by the spring force of the coil spring 68, rotate in the E and G directions, respectively.

Accordingly, in the braking state, pressures on the first and second rotating members 60 and 62 by the driving cam 74 are released, so that the brake shoes 64*a* and 66*a* are driven to a position to come into contact with the inside circumferential surface of the rim 76 of the corresponding rear wheel 20 or 22.

Next, a description is given of the braking operation of each electric brake unit 36.

In the braking state, the driving cam 74 rotates to close the first and second rotating members 60 and 62, and the brake shoes 64*a* and 66*a* are in contact with the engagement surface of the rim 76 of the corresponding rear wheel 20 or 22 as shown in FIG. 4. In this state, when an attempt is made to move the corresponding rear wheel 20 or 22 in the direction indicated by C, frictional forces are generated between the rim 76 and the brake shoes 64*a* and 66*a* so that the brake shoes 64*a* and 66*a* try to move in the C direction together with the rim 76.

However, the movement of the first rotating member 60 supporting the brake shoe 64*a* is restricted by the driving cam 74. Further, since the shaft 60*a*, which is the rotation center of the first rotating member 60, is positioned on the center side of the bracket 38, the frictional force generated between the rim 76 and the brake shoe 64*a* acts so as to cause the brake shoe 64*a* to bite further into the rim 76.

That is, as the corresponding rear wheel 20 or 22 is moved in the C direction with a greater force, the brake shoe 64*a* is caused to bite further into the rim 76*a* to generate a greater frictional force, thus resulting in a greater braking force. On the other hand, when the corresponding rear wheel 20 or 22 is moved in the direction indicated by arrow D, the brake shoe 66*a* acts in the same manner as the above-described brake shoe 64*a*.

Thus, in the braking state, when the rim 76 rotates in the C direction, the first brake member 64 rotates further in the E direction. As a result, the brake shoe 64*a* bites further into the rim 76, thus increasing a braking force on the rim 76. On the other hand, when the rim 76 rotates in the D direction, the second brake member 66 rotates further in the G direction. As a result, the brake shoe 66*a* bites further into the rim 76, thus increasing a braking force on the rim 76.

Thus, each electric brake unit 36 has the first and second brake members 64 and 66 disposed so as to rotate in the directions opposite to each other. Accordingly, it is ensured that strong braking forces are applied to the rear wheels 20 and 22 so as to stop the rear wheels 20 and 22 irrespective of their rotational directions.

Figure 5:
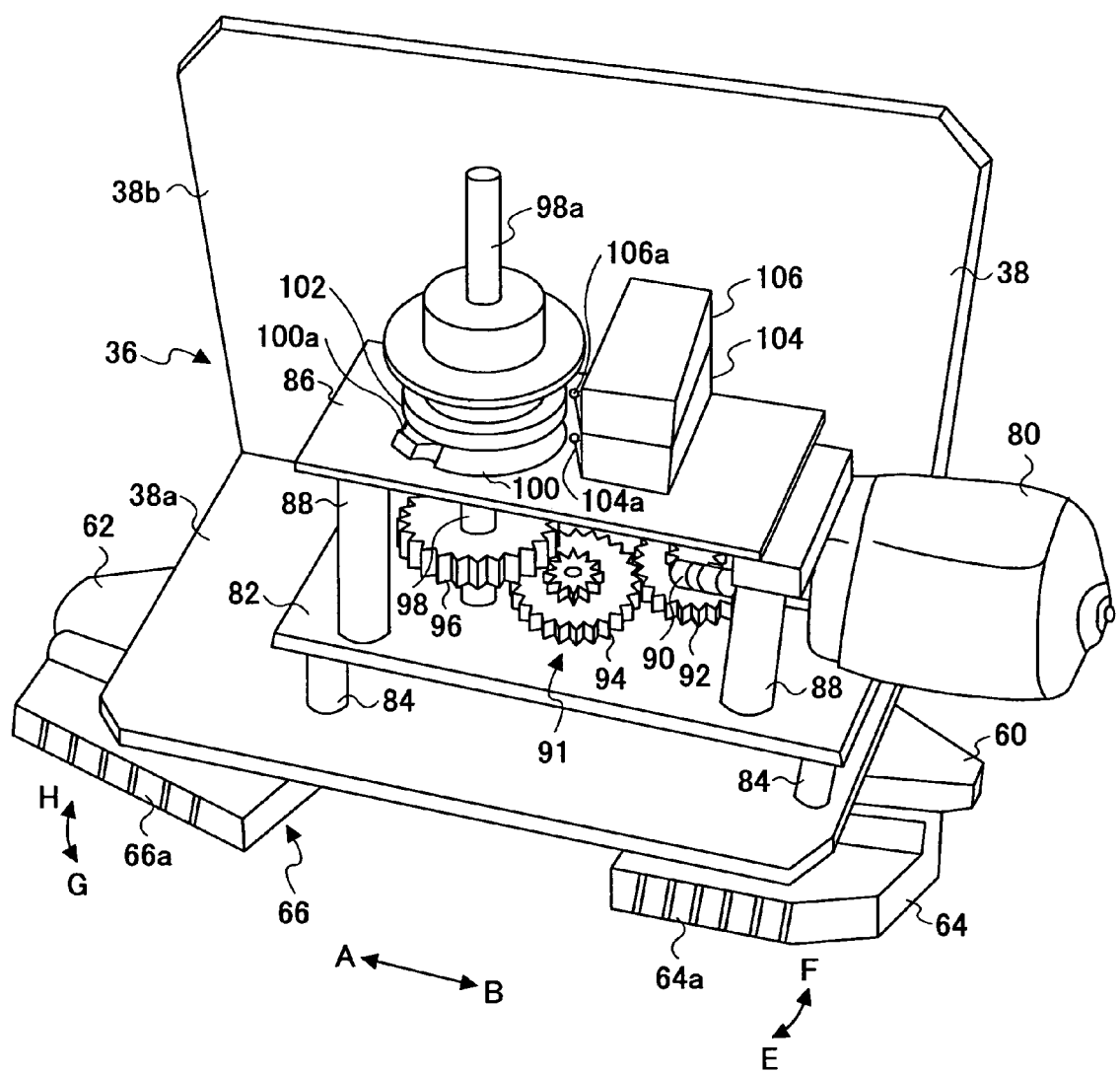
FIG. 5 is an enlarged perspective view of a drive mechanism of the electric brake unit according to the first embodiment of the present invention.

FIG. 5 is an enlarged perspective view of the drive mechanism 91 of the electric brake unit 36.

Referring to FIG. 5, the drive mechanism 91 of the electric brake unit 36 is supported on a horizontal part 38a of the bracket 38, and is fastened to the lower-part member 40 of the frame 12 through a vertical part 38b of the bracket 38.

On the horizontal part 38a of the bracket 38, a first base 82 is supported by multiple support posts 84, and a motor (M) 80 and reduction gears 92, 94, and 96 are supported rotatably on the first base 82. Further, a worm gear 90 provided to the rotary shaft of the motor 80 engages a small-diameter gear of the reduction gear 92. The reduction gear 92 engages the reduction gear 94, and a small-diameter gear of the reduction gear 94 engages the reduction gear 96. A drive shaft 98 penetrates through the reduction gear 96.

The drive shaft 98 has a lower end thereof fitted into the above-described driving cam 74 and an upper end 98a thereof fitted into a pair of first and second rotating cams 100 and 102. Accordingly, the rotational driving force of the motor 80 is transmitted to the drive shaft 98 via the worm gear 90, the reduction gears 92, 94, and 96, so that the driving cam 74 drives the first and second brake members 64 and 66 into the brake releasing state (FIG. 3) or the braking state (FIG. 4).

The rotating cams 100 and 102 are supported above a second base 86, which is supported by multiple support posts 88 on the first base 82. Further, first and second cam switches 104 and 106 are disposed on the second base 86.

The first cam switch 104, which is provided in the same plane as the first rotating cam 100, includes a movable contact piece 104a projecting sideward therefrom so as to be in proximity to the cam surface of the first rotating cam 100. When the movable contact piece 104a is depressed by the cam surface of the rotating cam 100, the first cam switch 104 outputs a detection signal to the control box 48.

The second cam switch 106 is placed on top of the first cam switch 104 so as to be positioned in the same plane as the second rotating cam 102. The second cam switch 106 includes a movable contact piece 106a projecting sideward therefrom so as to be in proximity to the cam surface of the second rotating cam 102. When the movable contact piece 106a is depressed by the cam surface of the rotating cam 102, the second cam switch 106 outputs a detection signal to the control box 48.

The cam surfaces of the rotating cams 100 and 102 include respective cam parts (of which only a cam part 100a of the cam surface of the rotating cam 100 is shown in the state of FIG. 5) projecting radially therefrom, the cam parts pressing the movable contact pieces 104a and 106a at respective rotational positions corresponding to operating states brought by the rotation of the driving cam 74 so as to detect the braking state and the brake releasing state in synchronization with the rotation of the driving cam 74.

Thus, each electric brake unit 36 has its components integrated with the corresponding bracket 38 as a unit. Accordingly, each electric brake unit 36 can be attached to the frame 12 relatively easily by attaching the bracket 38 thereto. As a result, the electric brake units 36 can be attached afterward even to a wheelchair that has been already in use.

Figure 6:
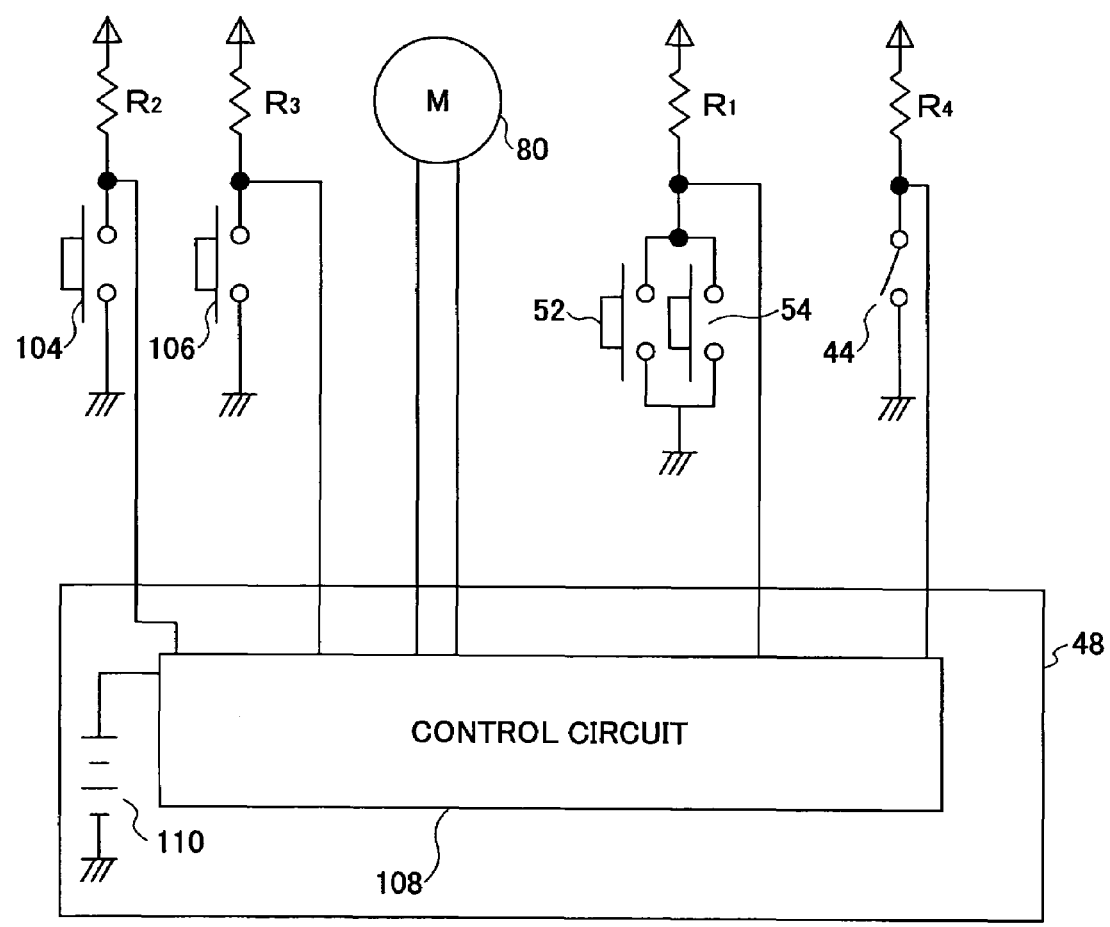
FIG. 6 is a block diagram showing a configuration of a control box and various switches according to the first embodiment of the present invention.

FIG. 6 is a block diagram showing an exemplary configuration of the control box 48 and various switches.

Referring to FIG. 6, the control box 48 includes the control circuit 108 and dry batteries 110 as a power supply. The control circuit 108 is connected to the dry batteries 110, the manual switch 44, the seating sensor switches 52 and 54, and the first and second cam switches 104 and 106 and the motor 80 of each electric brake unit 36.

The control circuit 108 operates by receiving power supplied from the dry batteries 110 to control the motor 80 so that the motor 80 is rotated in a forward or reverse direction or stopped in accordance with the states of the manual switch 44, the seating sensor switches 52 and 54, and the cam switches 104 and 106. For instance, as the dry batteries 110, four AA dry batteries connected in series to be able to output 6 V are contained in a battery box (not graphically represented).

Figure 7:
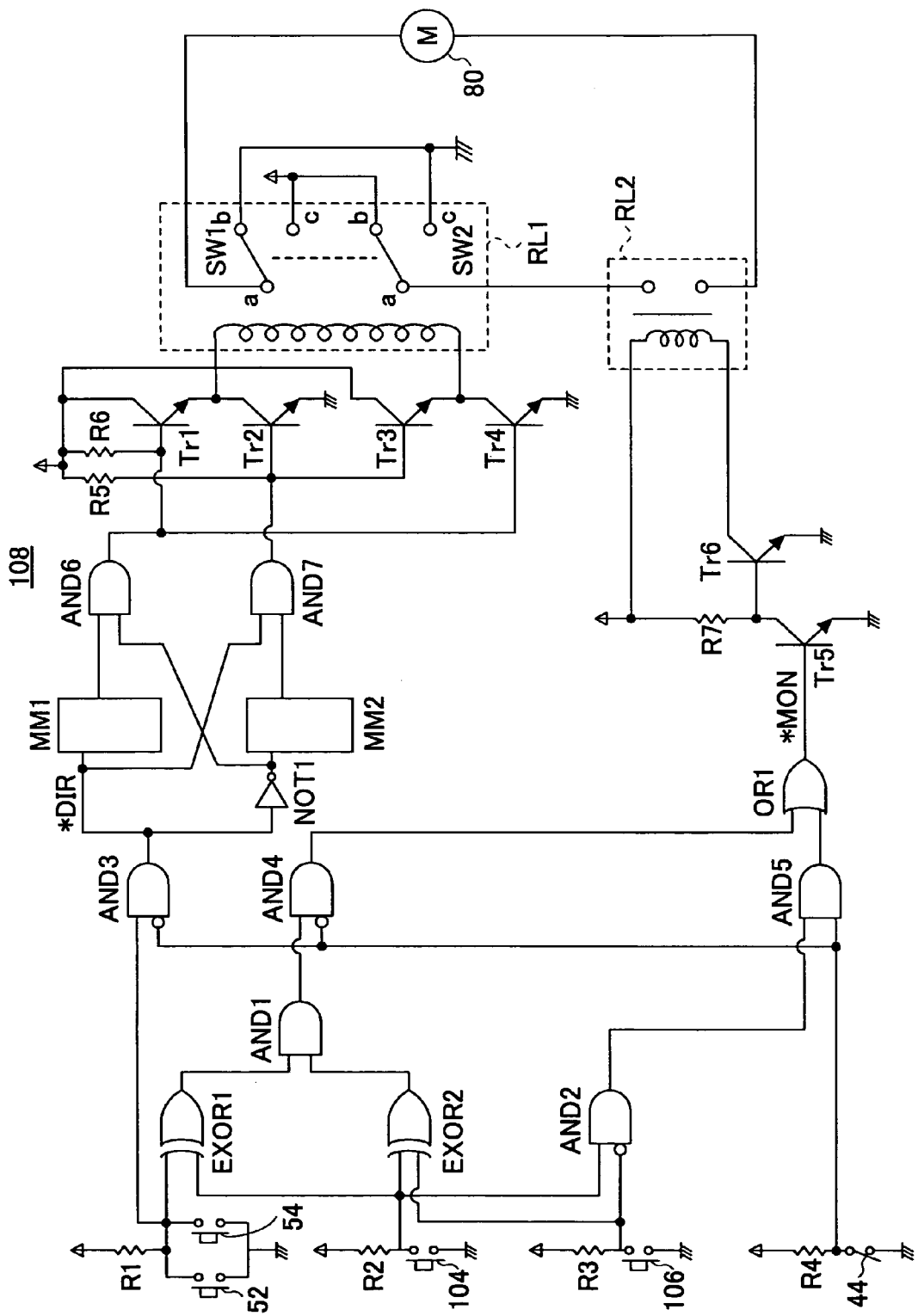
FIG. 7 is a circuit diagram showing a control circuit according to the first embodiment of the present invention.

FIG. 7 is a circuit diagram showing the control circuit 108.

Referring to FIG. 7, the seating sensor switches 52 and 54 are connected in parallel, and the output of the parallel connection of the seating sensor switches 52 and 54 is input to an Exclusive-OR gate EXOR1. The other input of the Exclusive-OR gate EXOR1 is connected to the first cam switch 104.

An Exclusive-OR gate EXOR2 has an input thereof connected to the cam switch 104 and the other input thereof connected to the second cam switch 106. An AND gate AND2 has an input thereof connected to the cam switch 104 and the other input thereof connected to the cam switch 106 via a NOT gate.

An AND gate AND1 has an input thereof connected to the output of the Exclusive-OR gate EXOR1 and the other input thereof connected to the output of the Exclusive-OR gate EXOR2. An AND gate AND 3 has an input thereof connected to the output of the parallel connection of the seating sensor switches 52 and 54 and the other input thereof connected to the manual switch 44 via a NOT gate.

An AND gate AND4 has an input thereof connected to the output of the AND gate AND1 and the other input thereof connected to the manual switch 44 via a NOT gate. An AND gate AND5 has an input thereof connected to the output of the AND gate AND2 and the other input thereof connected to the manual switch 44.

An OR gate OR1 has an input thereof connected to the output of the AND gate AND4 and the other input thereof connected to the output of the AND gate AND5. The output signal of the AND gate AND3 is provided to a subsequent circuit as a control signal *DIR indicating the rotational direction of the motor 80. Further, the output signal of the OR gate OR1 is provided to a subsequent circuit as a control signal *MON performing on-off control of the motor 80.

A pull-up resistor R1 is connected to the seating sensor switches 52 and 54. Pull-up resistors R2 and R3 are connected to the cam switches 104 and 106, respectively. A pull-up resistor R4 is connected to the manual switch 44. Further, +5 V is applied to each of the switches 52 or 54, 104, 106, and 44 via a corresponding one of the resistors R1 through R4.

The Exclusive-OR gates EXOR1 and EXOR2 output the control signal *MON driving the motor 80 when:

the driving cam 74 driven by the motor 80 is not in a brake releasing position with at least one of the seating sensor switches 52 and 54 detecting the weight of the user; and the driving cam 74 is not in a braking position to apply brakes with neither of the seating sensor switches 52 and 54 detecting the weight of the user.

The output of the AND gate AND2 becomes H (HIGH LEVEL) when the driving cam 74 is in the brake releasing position to release the brakes. The AND gate AND4 outputs the motor-driving control signal of the AND gate AND1 when the manual switch 44 is ON (L). The AND gate AND5 outputs the motor-driving control signal of the AND gate AND2 when the manual switch 44 is OFF (H). The outputs of the AND gates AND4 and AND5 are applied to the OR gate OR1 so that the logic of the AND gate AND1 is selectively output to become the control signal *MON to drive and control the motor 80 when the manual switch 44 is ON (L) and the logic of the AND gate AND2 is selectively output when the manual switch 44 is OFF (H) to become the control signal *MON to drive and control the motor 80.

The control signal *DIR output from the AND gate AND3 is provided to a monostable multivibrator MM1 and to a monostable multivibrator MM2 via a NOT gate NOT1. Each of the monostable multivibrators MM1 and MM2 detects a falling edge and outputs a positive-voltage one-shot pulse of a constant interval.

The NOT gate NOT1 is provided before the monostable multivibrator MM2. Accordingly, the monostable multivibrator MM2 outputs a one-shot pulse at a rising edge of the control signal *DIR. Further, the output of the monostable multivibrator MM1 is input to an input of an AND gate AND6. The output of the NOT gate NOT1 is connected to the other input of the AND gate AND6.

The output of the monostable multivibrator MM2 is connected to an input of an AND gate AND7. A signal line of the control signal *DIR is connected to the other input of the AND gate AND7. The AND gates AND6 and AND7 are provided to prevent a below-described latching relay RL1 from malfunctioning when the control signal *DIR switches in a period shorter than the pulse widths of the monostable multivibrators MM1 and MM2.

The output of the AND gate AND6 is connected to the base of each of transistors Tr1 and Tr4. The output of the AND gate AND7 is connected to the base of each of transistors Tr2 and Tr3. Each of the transistors Tr1, Tr2, Tr3, and Tr4 is of an NPN type.

The collectors of the transistors Tr1 and Tr3 are connected to a power supply terminal. The emitter of the transistor Tr1 is connected to a terminal of the drive coil of the latching relay RL1 and the collector of the transistor Tr2.

The emitter of the transistor Tr3 is connected to the other terminal of the drive coil of the latching relay RL1 and the collector of the transistor Tr4. The emitters of the transistors Tr2 and Tr4 are grounded.

According to the above-described circuit configuration, when a positive one-shot pulse is output from the AND gate AND6, the transistors Tr1 and Tr4 are turned on so that a current flows through the drive coil of the latching relay RL1 in the forward direction.

Meanwhile, when a positive one-shot pulse is output from the AND gate AND7, the transistors Tr2 and Tr3 are turned on so that a current flows through the drive coil of the latching relay RL1 in the reverse direction. Even if a situation in which the monostable multivibrators MM1 and MM2 may simultaneously output high-level (H) one-shot pulses occurs, the above-described operation of the AND gates AND6 and AND7 always causes only one of the AND gates AND6 and AND7 to become H (HIGH LEVEL).

The latching relay RL1 has the function of maintaining the switching operation of a relay switch by causing a one-shot pulse to flow through the coil. The relay-switch side of the latching relay RL1 includes two changeover switches SW1 and SW2.

A first terminal a of the changeover switch SW1 is connected to the motor 80. A second terminal b of the changeover switch SW1 is grounded. A third terminal c of the changeover switch SW1 is connected to the positive terminal of the power supply, that is, the dry batteries 110.

A first terminal a of the changeover switch SW2 is connected to a terminal of a relay RL2. A second terminal b of the changeover switch SW2 is connected to the positive terminal of the power supply, that is, the dry batteries 110. A third terminal c of the changeover switch SW2 is grounded.

The other terminal of the relay RL2 is connected to the motor 80. The relay RL2 is a common relay, and only operates while a current is flowing through its coil.

Meanwhile, the control signal *MON performing on-off control of the motor 80 is input to the base of an open-collector NPN transistor Tr5 forming a NOT gate. The emitter of the transistor Tr5 is grounded, and the collector thereof is connected to the base of an NPN transistor Tr6.

The base of the transistor Tr6 is pulled up by a resistor R7. The collector of the transistor Tr6 is connected to the coil of the relay RL2, and the emitter thereof is grounded.

According to the above-described circuit configuration, the coil of the relay RL2 is turned on by the switching transistor Tr6 when the control signal *MON performing on-off control of the motor 80 is at low potential (0 V).

Next, a description is given, with reference to FIGS. 8 and 9, of the control operation of the control circuit 108.

FIG. 8 is a timing chart of the control circuit 108. FIG. 9 is a truth table based on the timing chart of the control circuit 108 shown in FIG. 8. For easier understanding, the condition of the user and the output of each logic circuit are shown together in FIG. 9.

In FIGS. 8 and 9, a state of +5 V (high potential) is defined as H (HIGH LEVEL) and a state of 0 V (low potential) is defined as L (LOW LEVEL). The output of the parallel connection of the seating sensor switches 52 and 54 is H (OFF) when the user is standing and L (ON) when the user is seated.

The first cam switch 104 is L (ON) when the brake shoes 64a and 66a are in contact with the rim 76, and becomes H (OFF) when the motor 80 starts to rotate in the direction to move the brake shoes 64a and 66a away from the rim 76.

The output of the second cam switch 106 is L (LOW LEVEL) when the brake shoes 64a and 66a are out of contact with the rim 76, and becomes H (HIGH LEVEL) when the motor 80 starts to rotate in the direction to bring the brake shoes 64a and 66a into contact with the rim 76. The output of the manual switch 44 is L (LOW LEVEL) in the ON state and H (HIGH LEVEL) in the OFF state.

The control signal *MON drives the motor 80 when the control signal *MON is at L (LOW LEVEL). When the control signal *DIR is at H (HIGH LEVEL), the motor 80 is driven in a direction to apply brakes. When the control signal *DIR is at L (LOW LEVEL), the motor 80 is driven in a direction to release the brakes.

Next, a description is given of the operations at Times t1 through t16 in order.

[Operating State at Time t1]

First, with the manual switch 44 being ON (L), when the user has not sat down on the wheelchair 10 yet, and is standing, the seating sensor switches 52 and 54 have not detected the weight of the user (the parallel connection output thereof is H). Accordingly, the cam switch 104 is ON (L) and the cam switch 106 is OFF (H) with the electric brake unit 36 being braked.

When the manual switch 44 is ON (L), the AND gate AND3 directly outputs the logic of the seating sensor switches 52 and 54. At this point, the AND gate AND3 outputs H (HIGH LEVEL) indicating the direction to apply brakes.

Since the manual switch 44 is L (ON), the logic output of the OR gate OR1 is controlled by the AND gate AND4. At this point, the AND gate AND4 is H (HIGH LEVEL), indicating a state not to drive the motor 80. Accordingly, the OR gate OR1 outputs H (HIGH LEVEL). Therefore, the electric brake unit 36 is in the braking state shown in FIG. 4.

[Operating State at Time t2]

For instance, when the user in bed sits down on the seat 14 of the wheelchair 10 from the above-described state at Time t1, at least one of the seating sensor switches 52 and 54 provided on the seat 14 detects the weight of the user (the parallel connection output thereof is L). As a result, the AND gate AND3 outputs L (LOW LEVEL), indicating the direction to release the brakes in accordance with the L output of the seating sensor switches 52 and 54. At the same time, the AND gate AND4 outputs L (LOW LEVEL), indicating a state to drive the motor 80 in accordance with the L (LOW LEVEL) output of the AND gate AND1.

As a result, in the subsequent circuit, the monostable multivibrator MM2 detects through the NOT gate NOT1 that the control signal *DIR has switched from the direction to apply brakes to the direction to release the brakes, and switches the connection direction of the latching relay RL1. Further, the relay RL2 is turned on in response to the switching of the control signal *MON to L, so that the motor 80 is rotated.

[Operating State at Time t3]

When the motor 80 rotates, the worm gear 90 is rotated. The rotational speed of the motor 80 is reduced by the reduction gears 92, 94, and 96, while its driving force is increased to rotate the drive shaft 98 working together with the reduction gear 96. Then, the rotating cam 100 provided to the upper end 98a of the drive shaft 98 also rotates to soon turn the cam switch 104 OFF (H).

At this point, although each of the logics of the Exclusive-OR gates EXOR1 and EXOR2 is inverted, the result of the AND gate AND1 remains unchanged. Accordingly, the motor 80 continues to rotate.

[Operating State at Time t4]

When the motor 80 thus continues to rotate so that the driving cam 74 rotates up to the brake releasing position shown in FIG. 3, that is, a position to open the rotating members 60 and 62, the rotating cam 102 provided to the upper end 98a of the drive shaft 98 also rotates to soon turn the cam switch 106 ON (L).

That is, each of the logics of the Exclusive-OR gates EXOR1 and EXOR2 becomes H (HIGH LEVEL), so that the control signal *MON becomes H (HIGH LEVEL). As a result, the driving of the motor 80 is stopped. Accordingly, the electric brake unit 36 enters the brake releasing state shown in FIG. 3.

[Operating State at Time t5]

For instance, when the user stands up from the seat 14 of the wheelchair 10 to go to a rest room from the above-described state at Time t4, the seating sensor switches 52 and 54 stop detecting the weight of the user (the parallel connection output is H).

Then, the AND gate AND3 outputs H (HIGH LEVEL), indicating the direction to apply brakes in response to the output of the seating sensor switches 52 and 54. At the same time, the AND gate AND4 outputs L, indicating the state to drive the motor 80 in response to the output of the AND gate AND1.

As a result, in the subsequent circuit, the monostable multivibrator MM1 detects that the control signal *DIR has switched from the direction to release the brakes to the direction to apply the brakes, and switches the connection direction of the latching relay RL1. Further, the relay RL2 is turned on in response to the switching of the control signal *MON to L, so that the motor 80 is rotated in the reverse direction.

[Operating State at Time t6]

When the motor 80 thus rotates, the rotating cam 102 supported by the drive shaft 98 also rotates to soon turn the cam switch 106 OFF (H). At this point, the Exclusive-OR gate EXOR1 remains L (LOW LEVEL), so that the result of the AND gate AND1 remains unchanged. Accordingly, the rotary shaft of the motor 80 continues to rotate in the reverse direction.

[Operating State at Time t7]

When the motor 80 thus continues to rotate so that the driving cam 74 rotates up to the braking position shown in FIG. 4, that is, a position to close the rotating members 60 and 62, the rotating cam 100 supported by the drive shaft 98 also rotates to soon turn the cam switch 104 ON (L).

Then, each of the logics of the Exclusive-OR gates EXOR1 and EXOR2 becomes H (HIGH LEVEL), so that the control signal *MON becomes H (HIGH LEVEL). As a result, the driving of the motor 80 is stopped. Accordingly, the electric brake unit 36 enters the braking state shown in FIG. 4.

[Operating State at Time t8]

At this point, from the above-described state at Time t7 where the user is not using the wheelchair 10, the caregiver turns the manual switch 44 OFF (H), which, as described below, enables the caregiver to move the wheelchair 10. When the manual switch 44 is OFF (H), the control signal *MON is controlled by the logic output of the AND gate AND5.

The AND gate AND2 detects that the state of the cam switches 104 and 106 is not a braking state, and this logic output (L) of the AND gate AND2 switches the control signal *MON to L (LOW LEVEL), thereby driving the motor 80. At the same time, the switching of the state of the manual switch 44 to H (HIGH LEVEL) forces the control signal *DIR to be output in the direction to release the brakes (L) irrespective of the logic output of the seating sensor switches 52 and 54.

That is, the motor 80 is driven in the direction to release the brakes. Accordingly, the electric brake unit 36 enters the brake releasing state shown in FIG. 3. As a result, the caregiver can move the wheelchair 10 not occupied by the user.

[Operating State at Time t9]

When the motor 80 rotates, the rotating cam 102 supported by the drive shaft 98 also rotates to soon turn the cam switch 106 OFF (H). However, the AND gate AND2 remains L (LOW LEVEL). Accordingly, the motor 80 continues to rotate.

[Operating State at Time t10]

When the motor 80 continues to rotate so that the drive shaft 98 rotates up to the brake releasing position shown in FIG. 3, that is, a position to open the rotating members 60 and 62, the rotating cam 102 supported by the drive shaft 98 also rotates to soon turn the cam switch 106 ON (L). As a result, the logic of the AND gate AND2 becomes H (HIGH LEVEL), so that the control signal *MON becomes H (HIGH LEVEL), thus stopping the driving of the motor 80. Accordingly, the electric brake unit 36 is maintained in the brake releasing state shown in FIG. 3.

[Operating State at Time t11]

In the above-described state at Time t10, for instance, the user who has come out from the rest room sits down on the seat 14 of the wheelchair 10 while the caregiver is holding the wheelchair 10. At this point, however, the control signal

*MON is placed under the control of the AND gate AND2 by the manual switch 44, and the electric brake unit 36 has already been in the brake releasing state. Accordingly, the control signal *MON remains H (HIGH LEVEL).

Likewise, at this point, the control signal *DIR is also controlled by the manual switch 44. Therefore, the control signal *DIR remains L (LOW LEVEL). Accordingly, the electric brake unit 36 is in the brake releasing state shown in FIG. 3.

[Operating State at Time t12]

In the above-described state at Time t11, when the caregiver turns the manual switch 44 ON (L), the control signal *MON is placed under the control of the AND gate AND1 by the manual switch 44. Since the brakes have already been released, the control signal *MON remains H (HIGH LEVEL).

Likewise, at this point, the control signal *DIR is also freed from the control of the manual switch 44. Since the output of the parallel connection of the seating sensor switches 52 and 54 is L, the control signal *DIR remains L (LOW LEVEL).

[Operating State at Time t13]

For instance, when the user stands up from the seat 14 of the wheelchair 10 in order to go back to bed from the above-described state at Time t12, the same situation as the above-described situation at Time t5 occurs. That is, the seating sensor switches 52 and 54 stop detecting the weight of the user (the parallel connection output thereof is H). Then, the AND gate AND3 outputs H (HIGH LEVEL), indicating the direction to apply brakes in response to the output of the seating sensor switches 52 and 54. At the same time, the AND gate AND4 outputs L (LOW LEVEL) in response to the output of the AND gate AND1, so that the motor 80 starts to rotate in the direction to apply brakes.

[Operating State at Time t14]

When the motor 80 continues to rotate from the above-described state at Time t13, the same state as the above-described state at Time t6 is entered. That is, the cam switch 106 is turned OFF (H), and the motor 80 continues to rotate.

[Operating State at Time t15]

When the caregiver turns off the manual switch 44 from the above-described state at Time t14, the control signal *MON continues to be output, but the logic of the control signal *DIR switches. That is, when the caregiver turns off the manual switch 44 during a short period of time after the user stands up from the seat 14 when the motor 80 is rotating, the motor 80 reverses its operation from the direction to apply brakes to the direction to release the brakes. Accordingly, the electric brake unit 36 shifts to the brake releasing state shown in FIG. 3.

[Operating State at Time t16]

When the motor 80 continues to rotate from the above-described state at Time t15 so that the driving cam 74 rotates up to the brake releasing position shown in FIG. 3, that is, a position to open the rotating members 60 and 62, the same brake releasing state as the above-described brake releasing state at Time t10 is entered. That is, the cam switch 106 is turned ON (L) and the logic of the AND gate AND2 becomes H (HIGH LEVEL), so that the control signal *MON becomes H (HIGH LEVEL). As a result, the driving of the motor 80 is stopped, so that the brakes are released. Consequently, the caregiver can move the wheelchair 10 after the user stands up from the seat 14.

As described above, each electric brake unit 36 attached to the wheelchair 10 operates as follows:

(a) When the user sits down on the seat 14 of the wheelchair 10 with the manual switch 44 being ON, at least one of the seating sensor switches 52 and 54 is turned ON by the weight of the user. In response to this, the control circuit 108 drives the motor 80 to rotate the driving cam 74 to the angular position shown in FIG. 3, thereby moving the brake shoes 64a and 66a away from the rim 76 to release the brakes.

When the driving cam 74 rotates to the brake releasing position shown in FIG. 3, the cam switch 106 detects this, and the driving of the motor 80 is stopped.

(b) When the user stands up from the seat 14 of the wheelchair 10 with the manual switch 44 being ON, the seating sensor switches 52 and 54 are freed from the weight of the user, and thus are turned OFF.

In response to this, the motor 80 is driven to rotate the driving cam 74 to the angular position shown in FIG. 4, thereby bringing the brake shoes 64a and 66a into contact with the rim 76 to apply the brakes.

When the driving cam 74 rotates to the braking position shown in FIG. 4, the cam switch 104 detects this, and the driving of the motor 80 is stopped.

(c) When the manual switch 44 is turned OFF, no operation is performed if the brakes have already been released, and the brake shoes 64a and 66a are moved away from the rim 76 to release the brakes if the brakes have already been applied, irrespective of whether the user is seated on the wheelchair 10 or not.

According to the above-described electric brake units 36 according to the present invention, the brake shoes 64a and 66a are simply brought into contact with the rim 76. Accordingly, a necessary and sufficient braking force can be generated with extremely small power.

Further, the motor 80 of each electric brake unit 36 may be driven only between the contact of the brake shoes 64a and 66a with (the application thereof to) and the separation thereof (movement thereof away) from the rim 76. In the other states, the worm gear 90 on the rotary shaft of the motor 80 prevents reverse rotation of the motor 80.

According to this exemplary embodiment, four AA dry batteries are employed as a power source. It has been confirmed by experiments that four AA dry batteries can realize approximately 10,000 on-off operations and in the case of normal use, endure more than three months of use.

The electric brake units 36 are not only retrofittable to today's most widely used existing folding manual wheelchairs with ease, but also are prevented from hindering the folding of the wheelchair 10.

Further, each electric brake unit 36 applies a braking force by a static frictional force to the corresponding rim 76 of the wheelchair 10 in a quiescent state so as to prevent the wheelchair 10 from starting to move. That is, unlike a brake mechanism applying a strong braking force by a dynamic frictional force to a moving wheel, such as in the case of a typical bicycle, each electric brake unit 36 may simply have enough strength to support the total weight of the wheelchair 10 and the user. This means that each electric brake unit 36 can realize sufficient strength to ensure user safety even with a relatively simple structure such as sheet metal processing.

[Second Embodiment]

FIGS. 10 through 16 are plan views of an electric brake unit 120 according to a second embodiment of the present invention, showing an operation process of the electric brake unit 120. FIG. 17 is a circuit diagram showing a control circuit 122 according to the second embodiment. FIGS. 10 through 16 show an exemplary left-side electric brake unit 120, for use in, for example, the wheelchair 10 shown in FIGS. 1 and 2. The wheelchair 10 also includes the same electric brake unit 120 on the right side.

An exemplary configuration of the second embodiment may be realized by replacing the electric brake units 36 and the control circuit 108 of the first embodiment with the electric brake units 120 and the control circuit 122. The same elements as those of the first embodiment are referred to by the same numerals, and a description thereof is omitted. The mechanical drive part of the electric brake unit 120 including the brake shoes 64a and 66a that are not graphically represented is equal to that of the electric brake unit 36 of the first embodiment.

The electric brake unit 120 includes a cam 126 and a left cam switch 128 provided on the second base 86. The cam 126 is caused to rotate counterclockwise by the rotation of a motor 124. The left cam switch 128 is switched ON or OFF in accordance with the rotation angle of the cam 126. The cam 126 engages the drive shaft 98 projecting through the second base 86 to stand up thereon, and rotates counterclockwise together with the drive shaft 98. The periphery of the cam 126 includes a pair of arcuate recesses 126a and a pair of arcuate lobes 126b that are formed alternately with respect to the arcuate recesses 126a. The left cam switch 128 includes a contact piece 128a extending to be in contact with the periphery of the cam 126. Accordingly, when the end portion of the contact piece 128a comes into contact with one of the arcuate lobes 126b of the cam 126, the arcuate lobe 126b depresses the contact piece 128a so that the left cam switch 128 is turned OFF. When the end portion of the contact piece 128a comes into contact with one of the arcuate recesses 126a of the cam 126, the depressed contact piece 128a is released so that the left cam switch 128 is turned ON.

Thus, the electric brake unit 120 includes the single cam 126 and the single left cam switch 128. Accordingly, the number of components is smaller in the electric brake unit 120 than in the electric brake unit 36 of the first embodiment. As a result, the electric brake unit 120 can be manufactured at low costs, and battery replacement can be postponed by reduced power consumption.

The motor 124 is controlled so as to rotate the driving cam 74 in only one direction. The motor 124 is rotated when a below-described motor control signal output from the control circuit 122 becomes ON, and is stopped when the motor control signal becomes OFF.

Next, a description is given of the operation of the electric brake unit 120.

Figure 10:
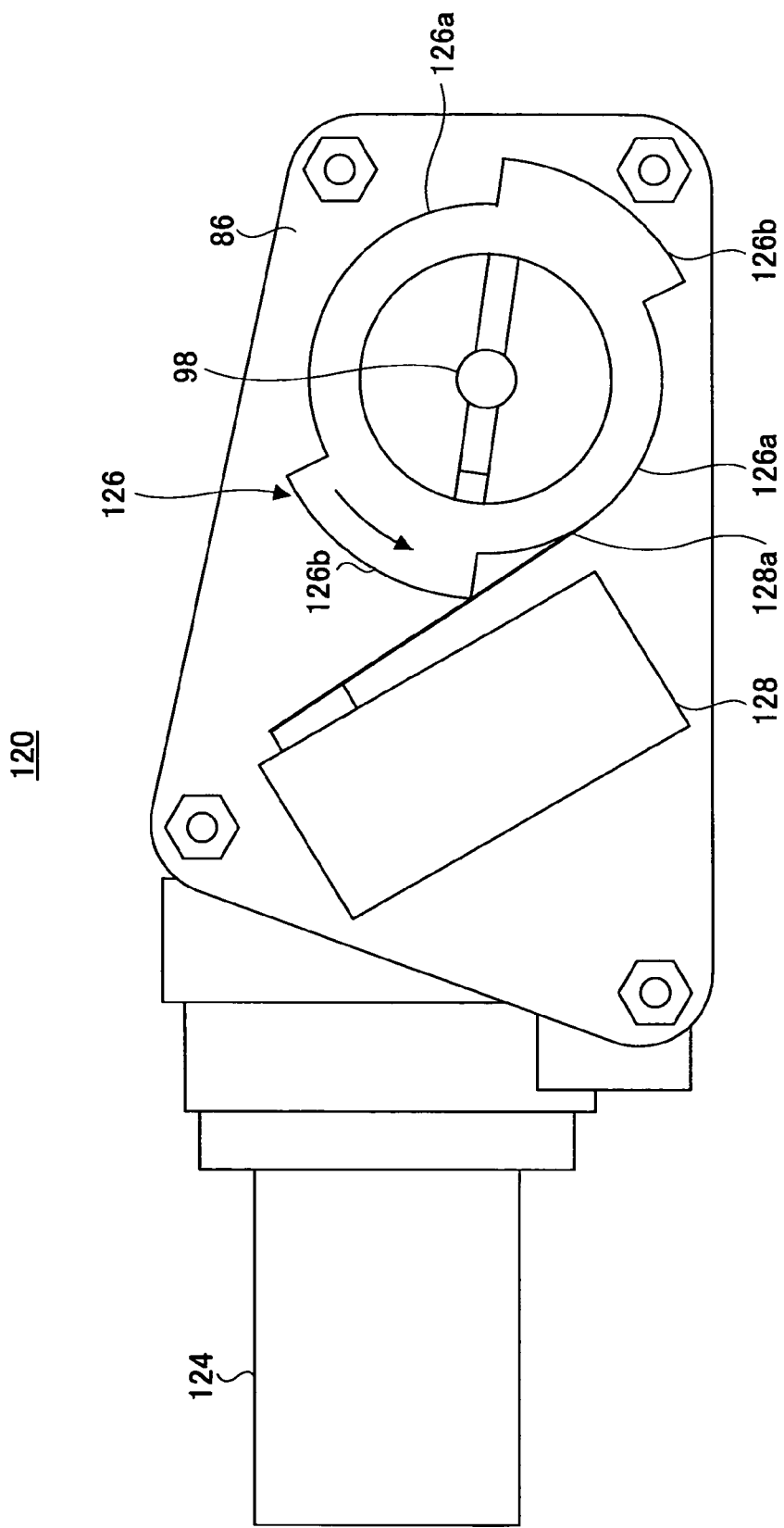
FIG. 10 is a plan view of an electric brake unit in a braking state according to a second embodiment of the present invention.

Referring to FIG. 10, in the electric brake unit 120, the end portion of the contact piece 128a of the left cam switch 128 is in contact with the arcuate recess 126a of the cam 126, so that the left cam switch 128 is ON. In this state, the user is not seated on the wheelchair 10, and the manual switch 44 is not operated by an attendant. That is, the electric brake unit 120 applies brakes and the motor 124 is stopped. In other words, the brake shoes 64a and 66a of the first and second brake members 64 and 66, respectively, are in the braking state as shown in FIG. 4.

When the user sits down on the wheelchair 10 in the stopped state of FIG. 10, the seating sensor switches 52 and 54 are turned ON, so that the motor 124 is rotated. Accordingly, the cam 126 rotates counterclockwise together with the drive shaft 98 rotated by the motor 124. As a result, the rotation angle of the cam 126 changes in the electric brake unit 120, so that the electric brake unit 120 goes through the brake releasing operation process shown in FIGS. 11 through 14.

Figure 11:
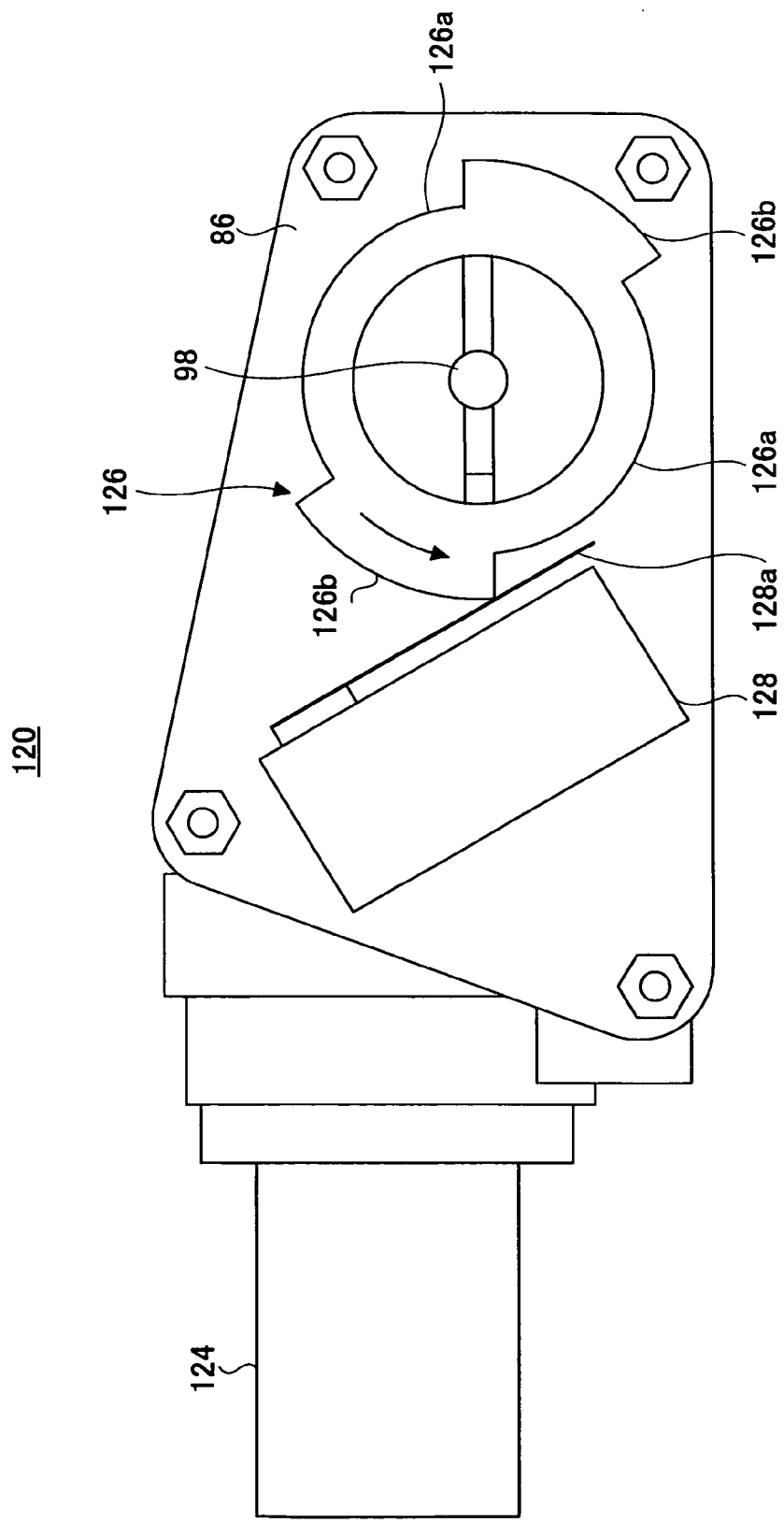
FIG. 11 is a plan view of the electric brake unit, showing an operation process subsequent to the state shown in FIG. 10 according to the second embodiment of the present invention.
Figure 12:
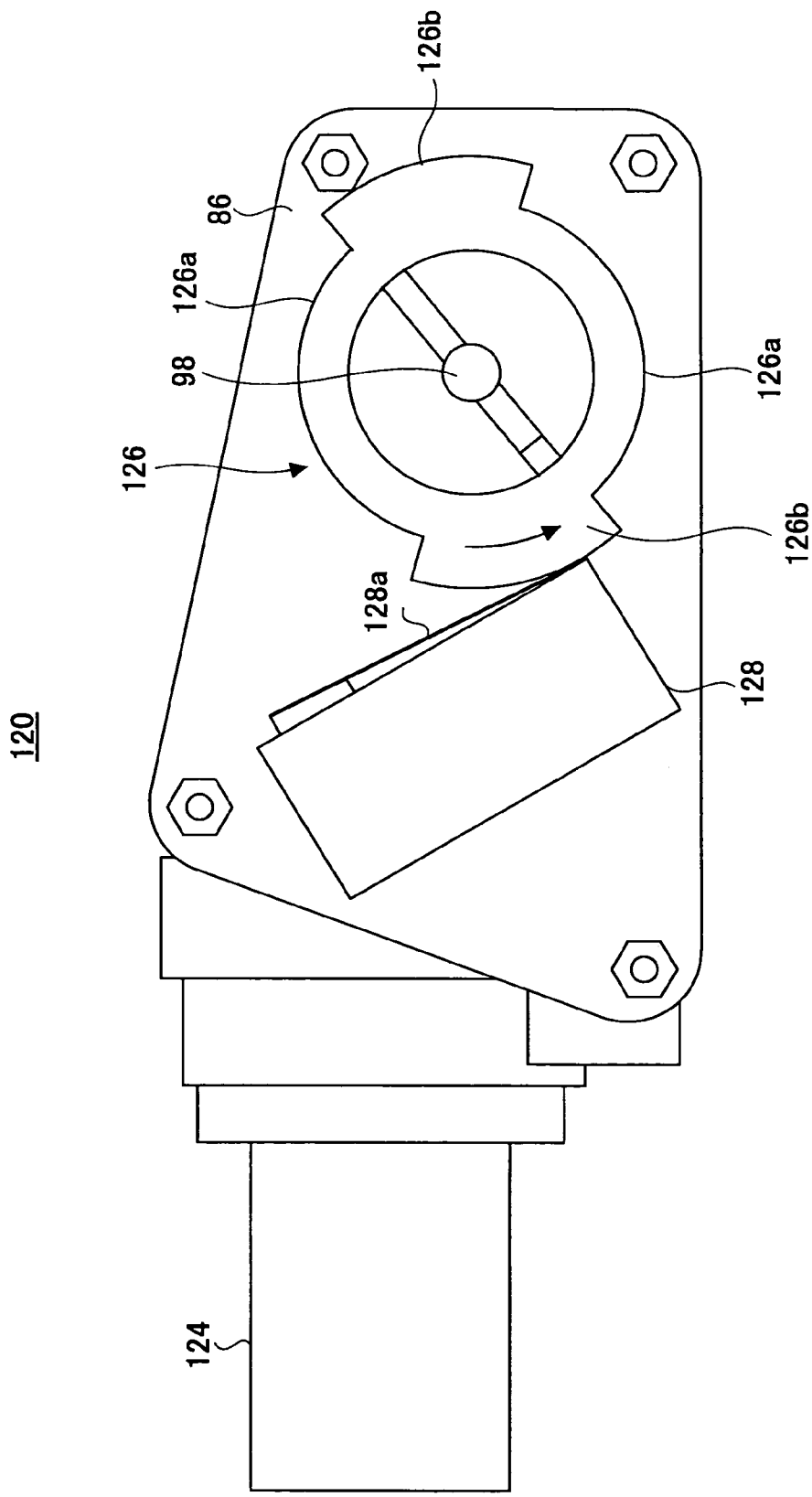
FIG. 12 is a plan view of the electric brake unit, showing an operation process subsequent to the state shown in FIG. 11 according to the second embodiment of the present invention.

In the operation process shown in FIG. 11, the brake shoes 64a and 66a of the first and second brake members 64 and 66 are in the braking state, being pressed against the inside circumferential surface of the rim 76 of the corresponding rear wheel 20 or 22 (FIG. 4). In the next operation process shown in FIG. 12, the rotation of the driving cam 74 causes the brake shoes 64a and 66a of the first and second brake members 64 and 66 to start to be separated from, or move away from, the inside circumferential surface of the rim 76 of the corresponding rear wheel 20 or 22.

Figure 13:
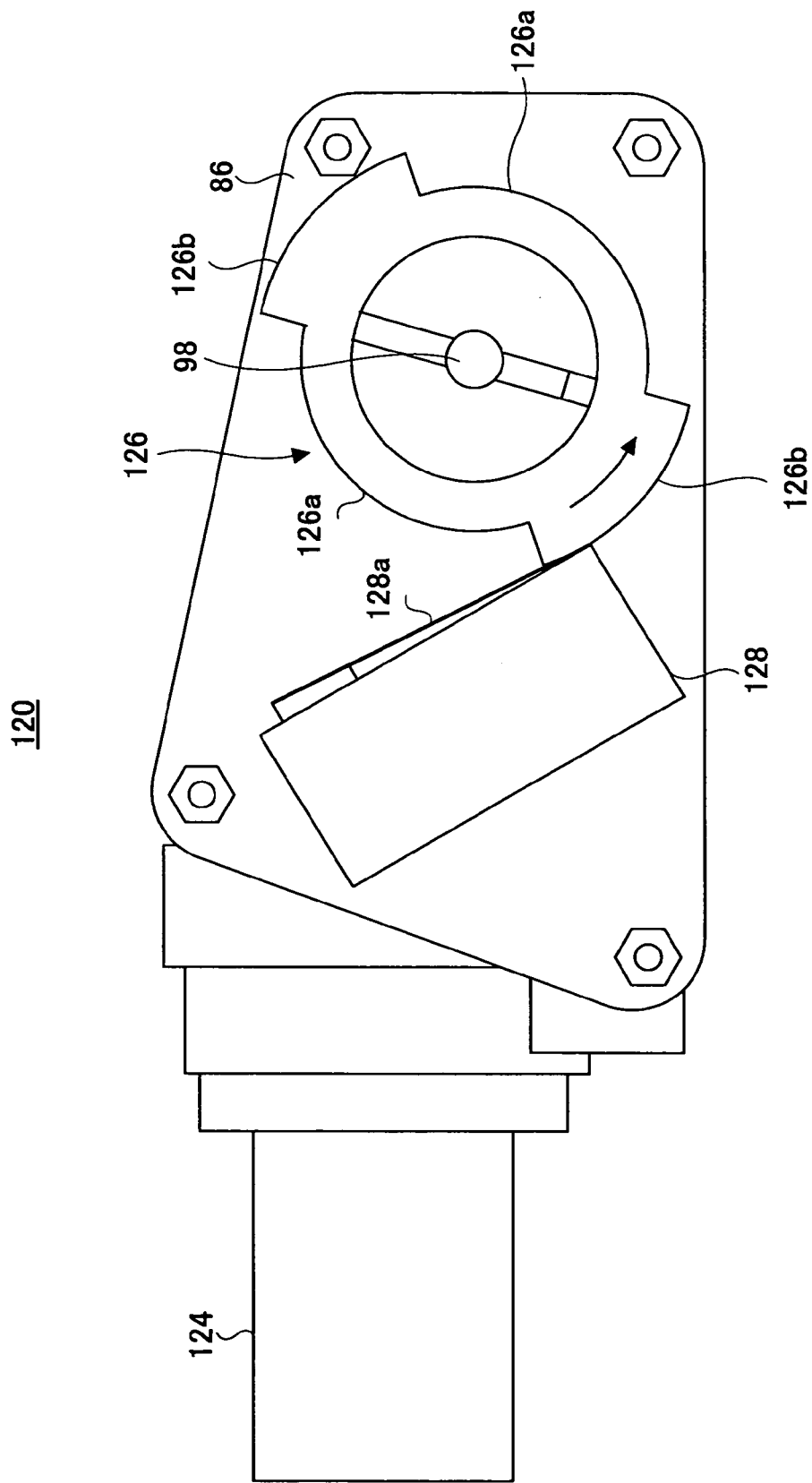
FIG. 13 is a plan view of the electric brake unit, showing an operation process subsequent to the state shown in FIG. 12 according to the second embodiment of the present invention.

In the next operation process shown in FIG. 13, the rotation of the driving cam 74 causes the brake shoes 64a and 66a of the first and second brake members 64 and 66 to move away from the engagement surface of the rim 76 of the corresponding rear wheel 20 or 22 (FIG. 3). Next, in FIG. 14, the end portion of the contact piece 128a is in contact with the arcuate recess 126a of the cam 126, so that the left cam switch 128 is turned ON. As a result, the rotation of the motor 124 is stopped.

At this point, the brake shoes 64a and 66a of the first and second brake members 64 and 66 are moved away from the inside circumferential surface of the rim 76, so that the brakes on the corresponding rear wheel 20 or 22 are released. As a result, the wheelchair 10 can be moved.

Thereafter, when the user seated on the wheelchair 10 stands up therefrom, the seating sensor switches 52 and 54 are turned OFF, so that the motor 124 is rotated. As a result, the cam 126 rotates counterclockwise to move from the position shown in FIG. 14 to the positions shown in FIGS. 15 and 16. In this operation process, the end portion of the contact piece 128a is in contact with the arcuate recess 126a, so that the left cam switch 128 remains ON. Further, the brake shoes 64a and 66a of the first and second brake members 64 and 66 remain separated from the inside circumferential surface of the rim 76 of the corresponding rear wheel 20 or 22.

Figure 15:
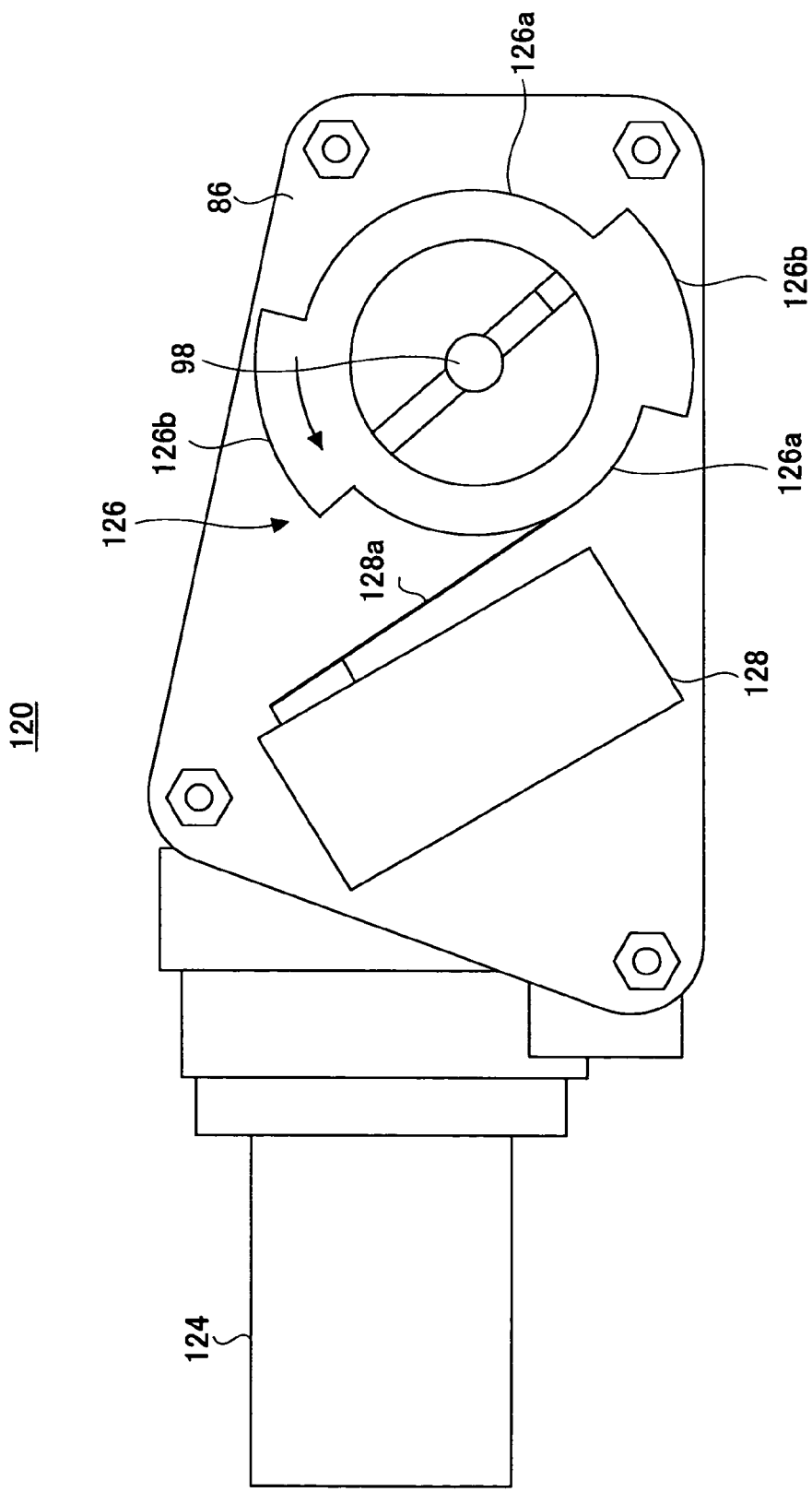
FIG. 15 is a plan view of the electric brake unit, showing an operation process subsequent to the state shown in FIG. 14 according to the second embodiment of the present invention.
Figure 16:
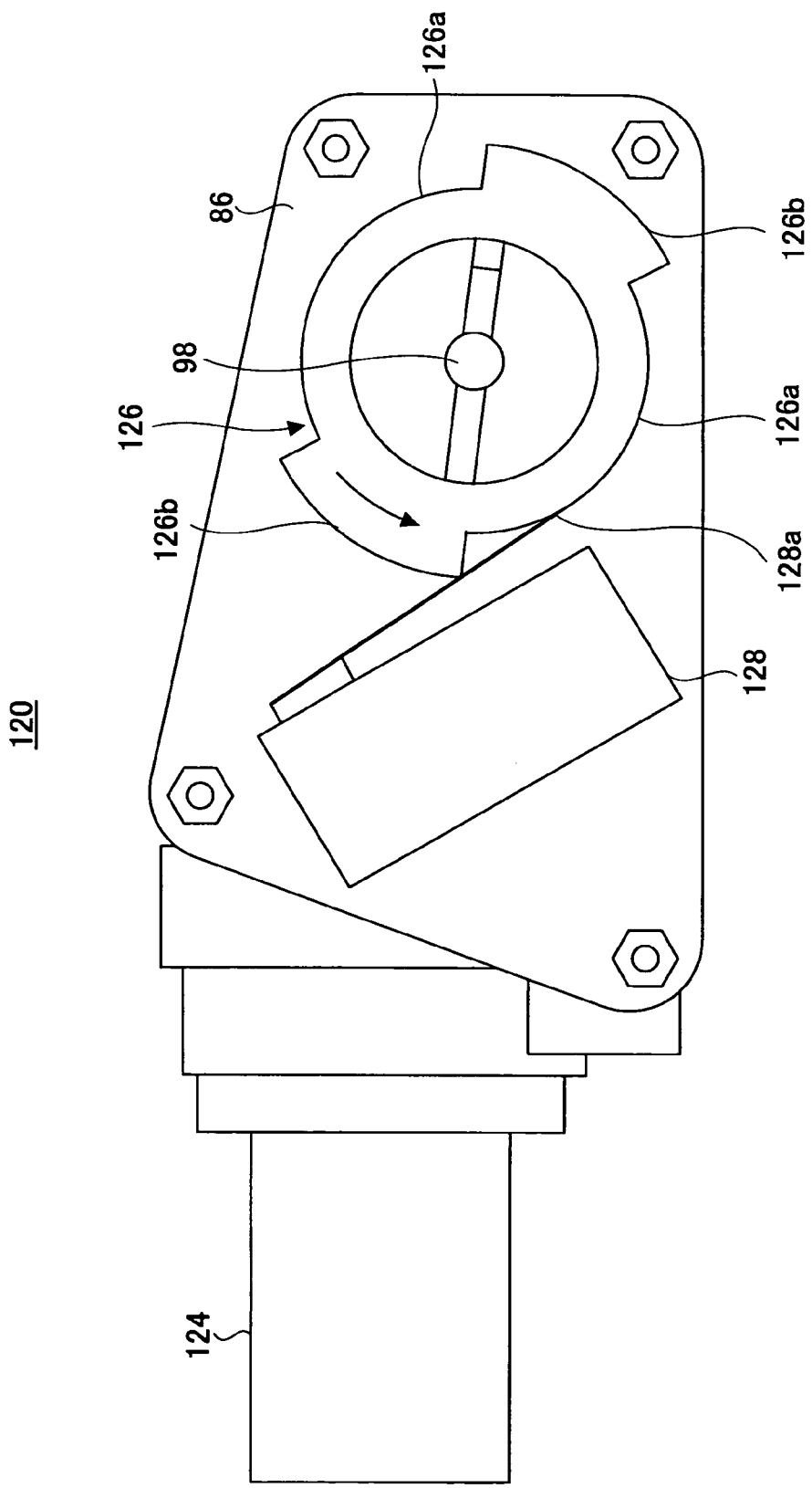
FIG. 16 is a plan view of the electric brake unit, showing an operation process subsequent to the state shown in FIG. 15 according to the second embodiment of the present invention.
Figure 17:
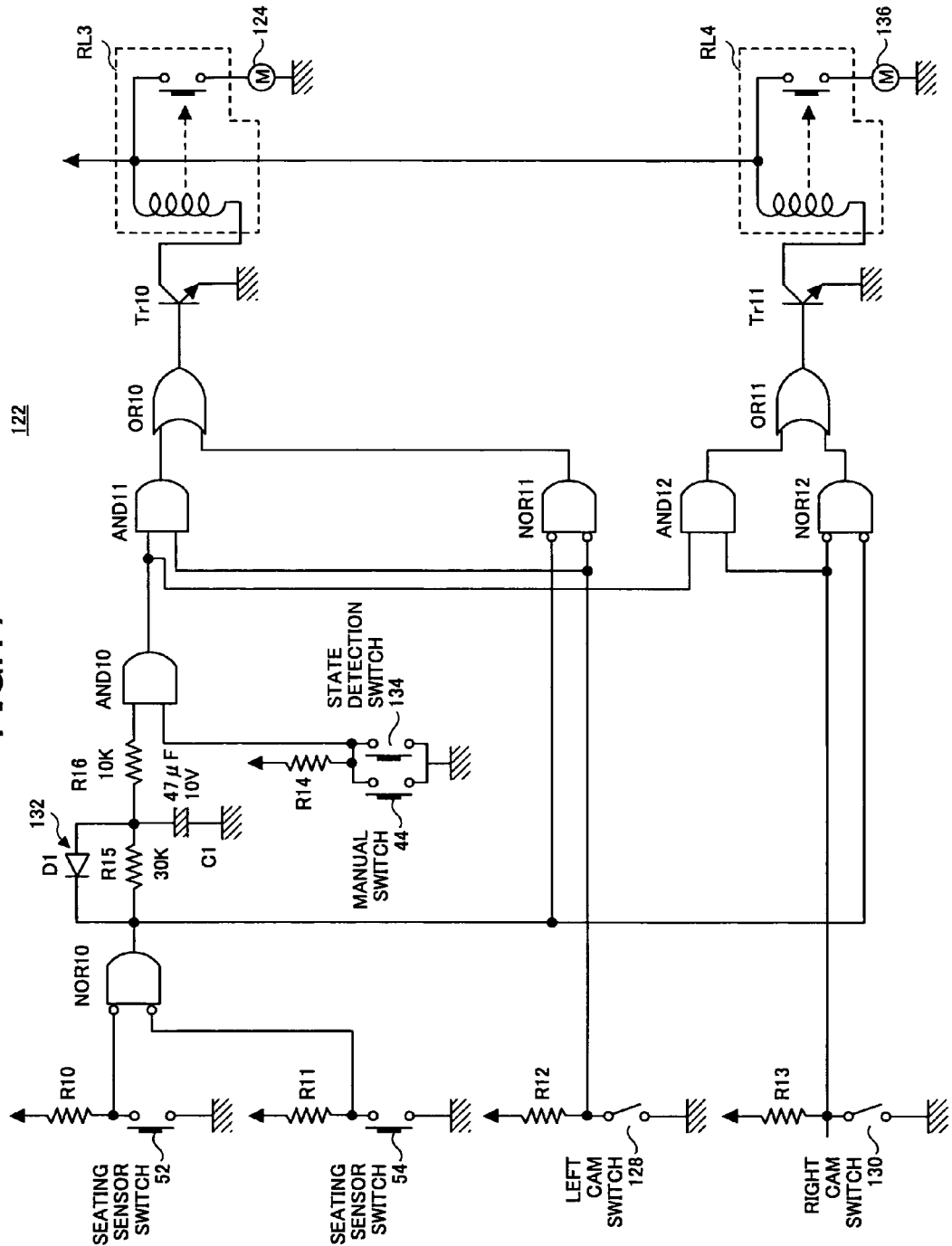
FIG. 17 is a circuit diagram showing a control circuit according to the second embodiment of the present invention.

The cam 126 rotates further counterclockwise to move from the position shown in FIG. 15 to the position shown in FIG. 16. As a result, the arcuate lobe 126b of the cam 126 comes into contact with the contact piece 128a (the same state as the above-described state of FIG. 10). When the cam 126 rotates counterclockwise, the same state as the above-described state of FIG. 11 is entered, where the contact piece 128a is pressed so that the left cam switch 128 is turned OFF. As a result, the motor 124 is stopped, and the brake shoes 64a and 66a of the first and second brake members 64 and 66 are caused by the spring force of the coil spring 68 to come into contact with the rim 76 of the corresponding rear wheel 20 or 22, thereby applying braking forces thereto (FIG. 4).

Next, a description is given of a configuration of the control circuit 122 controlling the (right-side and left-side) electric brake units 120.

As shown in FIG. 17, the control circuit 122 includes resistors R10 through R14, each being a pull-up resistor and having a resistance of, for instance, 47 KΩ. The manual switch 44 and the seating sensor switches 52 and 54 are the same as in the above-described first embodiment.

Each of the output terminals of the seating sensor switches 52 and 54 is connected to a NOR gate NOR10. That is, when it is ensured that both seating sensor switches 52 and 54 are pressed by the weight of the user to be turned ON, the output of the NOR gate NOR10 becomes H (HIGH LEVEL). The output terminal of the NOR gate NOR10 is connected to a delay circuit 132 composed of a resistor R15 and a capacitor C1. In the delay circuit 132, the resistor R15 is, for instance, 30 KΩ, and the capacitor C1 is, for instance, 47 μF. A delay time of approximately 1–2 sec is set depending on its time constant.

A diode D1 is connected in parallel to the resistor R15. Accordingly, the capacitor C1 discharges rapidly through the diode D1, and is charged slowly through the resistor R15.

As a result, when the user sits down on the wheelchair 10 to thereby turn at least one of the seating sensor switches 52 and 54 ON, the charging of the capacitor C1 starts, so that the voltage across the capacitor C1 becomes H (HIGH LEVEL) slightly after the sitting of the user.

Therefore, in this exemplary embodiment, even when the user sits down on the wheelchair 10, the motor 124 is not rotated immediately. Accordingly, at the time of an unstable weight shift immediately after the user sits down on the wheelchair 10, the stopped state where the braking forces by the first and second brake members 64 and 66 are exerted on the rear wheels 20 and 22 is maintained, thus further increasing safety.

The output side of the delay circuit 132 is connected to an input terminal of an AND gate AND10 via a resistor R16. Further, the manual switch 44 and a state detection switch (a state detection part) 134 are connected in parallel, and the output of the parallel connection of the manual switch 44 and the state detection switch 134 is input to the other input terminal of the AND gate AND10. The state detection switch 134 detects whether the wheelchair 10 is not in the normal use state, when it is not possible to be seated on the wheelchair 10. In other words, the state detection switch 134 detects the unused state of the wheelchair 10 where the wheelchair 10 is collapsed and unused.

In folding the wheelchair 10 laterally, the X-shaped connecting members 56 and 58 connecting the frame 12 and the lower-part members 40 are rotated as described above. Therefore, according to this embodiment, for instance, a switch that detects the rotational positions of the X-shaped connecting members 56 and 58 may be employed as the state detection switch 134. In this case, the state detection switch 134 is turned ON when the X-shaped connecting members 56 and 58 are folded to collapse the wheelchair 10, and is turned OFF when the X-shaped connecting members 56 and 58 are extended laterally to expand the wheelchair 10. When the X-shaped connecting members 56 and 58 are extended laterally, it is possible to be seated on the wheelchair 10; that is, the wheelchair 10 is usable. Accordingly, whether the wheelchair 10 is in a state where it is possible to sit down on the wheelchair 10 (in the normal use state or usable state) or in a state where it is not possible to sit down on the wheelchair 10 (not in the normal use state or in the unused state) can be determined based on the on-off operation of the state detection switch 134.

When the attendant moves the wheelchair 10, it may be inconvenient for the attendant to press the manual switch 44 while moving. When the wheelchair 10 is folded, there is no need to apply brakes. Accordingly, the state detection switch 134 is provided to detect that the wheelchair 10 is in the state where it is not possible to be seated on the wheelchair 10 (or not in the normal use state).

When either one of the manual switch 44 and the state detection switch 134, which are connected in parallel, is turned ON, the output of the AND gate AND 10 becomes L (LOW LEVEL) irrespective of the state of the seating sensor switches 52 and 54.

The output terminal of the AND gate AND10 is connected to an input terminal of an AND gate AND11 and an input terminal of an AND gate AND12. Further, the output terminal of the NOR gate NOR10 is connected to an input terminal of a NOR gate NOR11 and an input terminal of a NOR gate NOR12. The left cam switch 128 is connected to the other input terminal of the NOR gate NOR11, and a right cam switch 130, which is provided to the right side of the wheelchair 10, is connected to the other input terminal of the NOR gate NOR12.

The AND gates AND11 and AND12 are equal in operation, and the NOR gates NOR11 and NOR12 are equal in operation. Accordingly, hereinafter, a description is given of the operations of only the AND gate AND11 and the NOR gate NOR11, and a description of the operations of the AND gate AND12 and the NOR gate NOR12 is omitted. That is, a description is given of the operation of the left cam switch 128, and a description of the operation of the right cam switch 130, which is the same operation, is omitted.

A description is given herein of the control circuit 122.

When a delay time set by the delay circuit 132 composed of the capacitor C1 and the resistor R15 passes after the user sits down on the wheelchair 10 with both the manual switch 44 and the state detection switch 134 being OFF, the output of the AND gate AND10 becomes H (HIGH LEVEL).

When the AND gate AND10 becomes H (HIGH LEVEL) with the left cam switch 128 being OFF, that is, with the output of the left cam switch 128 being H (HIGH LEVEL), the output of the AND gate AND11 becomes H (HIGH LEVEL) so as to turn an open-collector transistor switch Tr10 ON through an OR gate OR10. When the transistor switch Tr10 is turned ON, a relay RL3 is turned ON, so that the motor 124 connected to the relay RL3 is rotated. As a result, the driving cam 74 and the drive shaft 98 of the cam 126 rotate counterclockwise.

As shown in FIGS. 10 through 14, the rotation of the motor 124 brings the end portion of the contact piece 128a into contact with the arcuate recess 126a of the cam 126, so that the output of the left cam switch 128 becomes L (ON). Thus, when the cam 126 rotates counterclockwise so that the left cam switch 128 switches from OFF to ON, the output of the AND gate AND11 becomes L (LOW LEVEL). As a result, the transistor switch Tr10 is turned OFF through the OR gate OR10 to turn the relay RL3 OFF, so that the motor 124 connected to the relay RL3 is stopped.

At this point, the brake shoes 64a and 66a of the first and second brake members 64 and 66 are moved away from the inside circumferential surface of the rim 76 of the corresponding rear wheel 20 or 22, so that brakes on the corresponding rear wheel 20 or 22 are released. As a result, the wheelchair 10 can be moved.

Further, when the user stands up from the wheelchair 10 with the left cam switch 128 being ON, that is, with the output of the left cam switch 128 being L (LOW LEVEL), the output of the NOR gate NOR10 becomes L (LOW LEVEL). As a result, the output of the NOR gate NOR11 becomes H (HIGH LEVEL) so as to turn the open-collector transistor switch Tr10 ON through the OR gate OR10. When the transistor switch Tr10 is turned ON, the relay RL3 is turned ON, so that the motor 124 connected to the relay RL3 is rotated.

Figure 14:
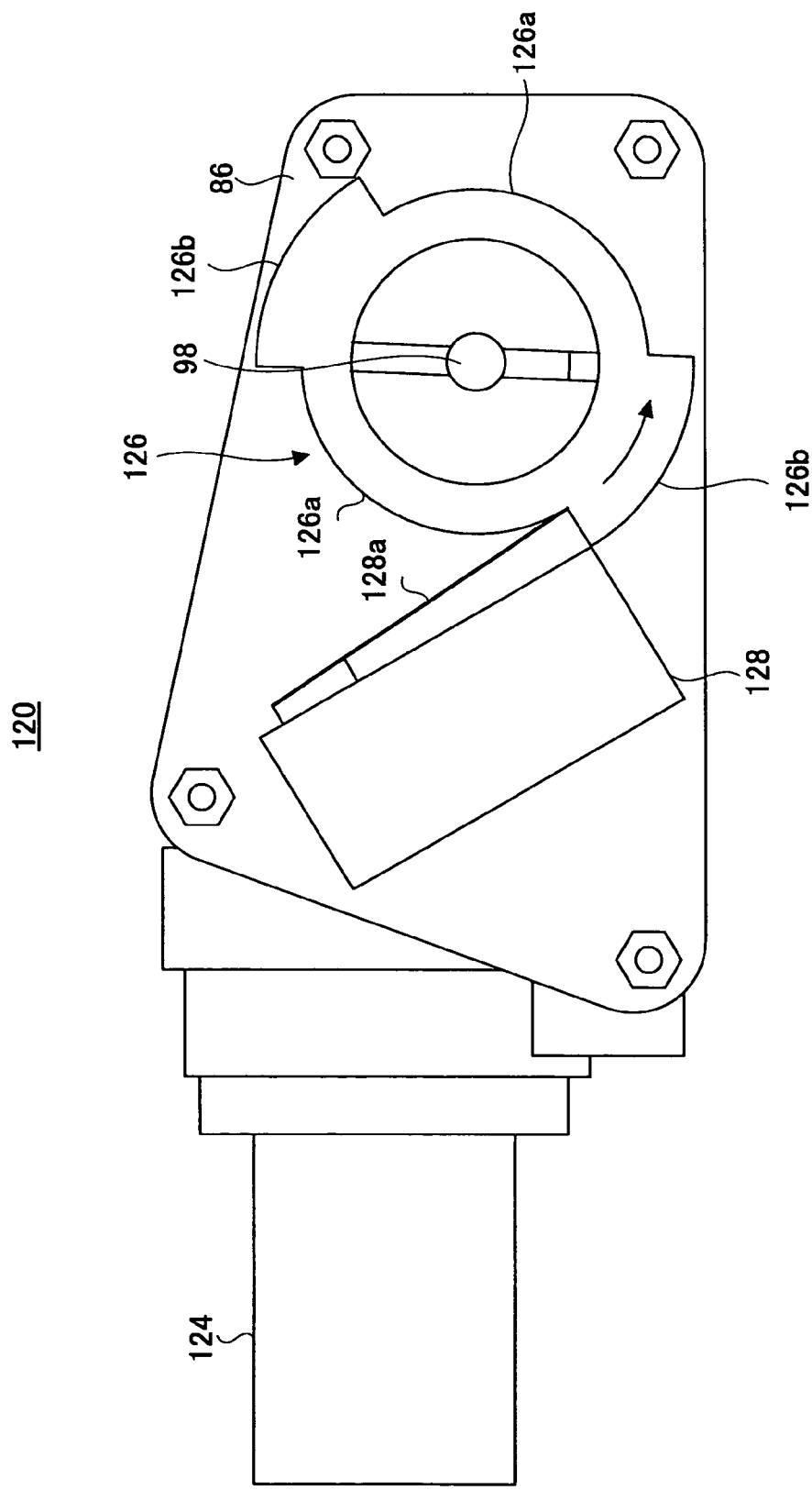
FIG. 14 is a plan view of the electric brake unit, showing an operation process subsequent to the state shown in FIG. 13 according to the second embodiment of the present invention.

When the motor 124 is thus rotated as shown in FIGS. 14 through 16, the contact piece 128a is depressed so that the output of the cam switch 128 becomes H (OFF) (state of FIG. 11). As a result, the motor 124 is stopped, and the brake shoes 64a and 66a of the first and second brake members 64 and 66 are caused by the spring force of the coil spring 68 to come into contact with the rim 76 of the corresponding rear wheel 20 or 22, thereby applying braking forces thereto (FIG. 4).

In FIG. 17, an OR gate OR11 corresponds to the OR gate OR10, a transistor switch Tr11 corresponds to the transistor switch Tr10, a relay RL4 corresponds to the relay RL3, and a motor 136 corresponds to the motor 124.

Thus, in the second embodiment, not only the same effects as in the above-described first embodiment are produced, but also the following effects are obtained.

For instance, brakes are not released until a delay time set by the delay circuit 132 passes after the user sits down on the wheelchair 10. Accordingly, at the time of instability when the user has not shifted weight completely to the wheelchair 10 in sitting down thereon, the brakes are prevented from being released, thus further increasing safety.

Further, the state detection switch (state detection part) 134 detecting the folded state of the wheelchair 10 is provided so that brakes are released when the folded state of the wheelchair 10 is detected. As a result, when the attendant moves the wheelchair 10 alone, the braking forces by the first and second brake members 64 and 66 are released by folding the wheelchair 10 without pressing the manual switch 44. Accordingly, more convenience can be provided in moving the wheelchair 10 when the wheelchair 10 is not in use.

The present invention is not limited to the above-described embodiments, and various applications may be made. Example applications are as follows.

(a) The configuration of the control circuit 108 according to the first embodiment is not limited to the logic circuit configuration shown in FIG. 7 as long as logics satisfying the braking operation are output.

(b) The logic circuit shown in FIG. 7 may be replaced by a microcomputer.

(c) Instead of the seating sensor switches 52 and 52 detecting the weight of the user, infrared sensors detecting the temperature of the user or photointerrupters detecting the existence of the user may be provided to the seat 14, armrests, or handrails.

(d) The brake members 64 and 66 may come into contact with the tire parts of the corresponding rear wheel 20 or 22 instead of the rim 76 thereof.

(e) The brake members 64 and 66 are not limited to the configuration where the respective brake shoes 64a and 66a come into contact with the corresponding rim 76. The brake members 64 and 66 may be configured with other brake mechanisms such as well-known disc brakes employed for a bicycle. In this case, the electric brake units 36 and 120 according to the present invention may be retrofitted to the wheelchair 10 if disc brakes have been or can easily be incorporated into the rear wheels 20 and 22 of the wheelchair 10.

(f) The electric brake units 36 are also applicable in the case of integrating the electric brake units 36 with the wheelchair 10 in its manufacturing process in a factory.

(g) It is also possible to drive the manual brakes 28 of the wheelchair 10 instead of the brake members 64 and 66 according to the present invention.

(h) The electric brake units 36 of the first embodiment and the electric brake units 120 of the second embodiment are applicable not only to the wheelchair 10, but also to any manually-propelled vehicle pushed and moved by a man, such as a stroller.

In the second embodiment, the seating sensor switches 52 and 54 may be omitted so that the brakes of the electric brake units 120 may be released by only the manual switch 44.

For instance, when a mother carries her baby in a stroller, the mother has to keep the manual switch 44 fixed to a handle ON. Accordingly, when the mother releases her grip on the handle, the electric brake units 120 provided to the stroller automatically apply braking forces to the wheels of the stroller. As a result, the safety of the baby is ensured.

That is, the present invention is applicable not only to wheelchairs, but also to general manually-propelled vehicles including strollers and handcarts.

Thus, according to the present invention, a necessary and sufficient braking force can be applied, with a simple configuration, to a manual wheelchair when a user stands up therefrom, thus ensuring, for instance, that the user is prevented from losing a body balance to totter or tumble in sitting down on the seat. Further, the brake unit according to the present invention is not only retrofittable to today's most widely used existing folding manual wheelchairs with ease, but also attachable so as not to hinder the folding of the wheelchair. Further, a lever is not pressed against the buttocks of the user in order to detect the user seated on the seat. As a result, causing discomfort to the user is prevented.

Further, in the case of applying the present invention to a manually-propelled vehicle other than a wheelchair, first and second brake members also brake the wheels when a state detection part detects that the manually-propelled vehicle is in the normal use state, and the first and second brake members are also moved away from the wheels so as to release the braking of the wheels so that the manually-propelled vehicle becomes movable when the state detection part detects that the manually-propelled vehicle is not in the normal use state. Thus, the present invention is applicable to, for instance, strollers and handcarts.

Further, a control signal causing the braking of the wheels by the electric brake units to be released is output thereto after passage of a predetermined period of time since a detection part outputs a detection signal detecting the seating of the user on the seat. Accordingly, at the time of an unstable weight shift immediately after the user sits down on the wheelchair, the stopped state where the braking forces by the first and second brake members are exerted on the wheels is maintained, thus further increasing safety.

The present invention is not limited to the specifically disclosed embodiments, and variations and modifications may be made without departing from the scope of the present invention.

The present application is based on Japanese Priority Patent Applications No. 2003-364986, filed on Oct. 24, 2003, and No. 2004-228145, filed on Aug. 4, 2004, the entire contents of which are hereby incorporated by reference.

What is claimed is:

1. A wheelchair comprising:

a seat;

a pair of wheels provided on first and second sides of the seat;

a detection part configured to indicate presence or absence of a user on the seat;

a pair of electric brake units configured to switch between applying braking forces to and releasing braking forces from the wheels based on control signals; and a control part connected to the detection part and the electric brake units, the control part being configured to output the control signals to the electric brake units, the control signals including a first control signal causing the braking forces by the electric brake units to be applied to the wheels and a second control signal causing the braking forces by the electric brake units to be released from the wheels, the first control signal being output when the detection part indicates the absence of the user on the seat and the second control signal being output when the detection part indicates the presence of the user on the seat; and an input part configured to be manually operated so as to input a signal to the control part, wherein when the input part is manually operated so as to input the signal to the control part, the control part outputs the second control signal irrespective of the presence or absence of the user on the seat indicated by the detection part.

2. A wheelchair comprising:
a seat;
a pair of wheels provided on first and second sides of the seat;
a detection part configured to indicate presence or absence of a user on the seat;
a pair of electric brake units configured to switch between applying braking forces to and releasing braking forces from the wheels based on control signals; and
a control part connected to the detection part and the electric brake units, the control part being configured to output the control signals to the electric brake units, the control signals including a first control signal causing the braking forces by the electric brake units to be applied to the wheels and a second control signal causing the braking forces by the electric brake units to be released from the wheels, the first control signal being output when the detection part indicates the absence of the user on the seat and the second control signal being output when the detection part indicates the presence of the user on the seat
wherein the control part outputs the second control signal to the electric brake units after passage of a predetermined period of time after the detection part indicates the presence of the user on the seat.

3. The wheelchair as claimed in claim 1, wherein the detection part indicates the presence or absence of the user based on detection of weight of the user.

4. A brake unit for a wheelchair, comprising:
a brake member operable to switch between applying braking forces to and releasing braking forces from a wheel of the wheelchair;
a driving part configured to drive the brake member to a braking position;
a detection part configured to indicate presence or absence of a user on a seat of the wheelchair; and
a control part connected to the detection part and the driving part, the control part being configured to control the driving part so that when the detection part indicates the absence of the user on the seat, the driving part transmits a driving force to the brake member to apply the braking forces to the wheel, and when the detection part indicates the presence of the user on the seat, the driving part stops the driving force to release the brake forces from the wheel; and
an input part configured to be manually operated so as to input a signal to the control part,
wherein when the input part is manually operated so as to input the signal to the control part, the control part controls the driving part so that the driving part stops the driving force to release the brake forces from the wheel irrespective of the presence or absence of the user on the seat indicated by the detection part.

5. A brake unit for a wheelchair, comprising:
a brake member operable to switch between applying braking forces to and releasing braking forces from a wheel of the wheelchair;
a driving part configured to drive the brake member to a braking position;
a detection part configured to indicate presence or absence of a user on a seat of the wheelchair; and
a control part connected to the detection part and the driving part, the control part being configured to control the driving part so that when the detection part indicates the absence of the user on the seat, the driving part transmits a driving force to the brake member to apply the braking forces to the wheel, and when the detection part indicates the presence of the user on the seat, the driving part stops the driving force to release the brake forces from the wheel
wherein the control part controls the driving part so that the driving part stops the driving force to release the braking forces from the wheel after passage of a predetermined period of time after the detection part indicates the presence of the user.

6. A brake unit for a manually-propelled vehicle, the brake unit being attached near one side of a wheel of the manually-propelled vehicle, the brake unit comprising:
a fixing member attached to a frame of the manually-propelled vehicle so as to oppose an inside of the wheel;
a first rotating member attached to the fixing member so as to be rotatable in a first direction in which the wheel moves;
a first brake member supported by the first rotating member;
a second rotating member attached to the fixing member so as to be rotatable in a second direction in which the wheel moves, the second direction being opposite to the first direction;
a second brake member supported by the second rotating member;
an urging member configured to urge the first and second rotating members so that the first and second brake members are pressed in a direction to come into contact with the wheel; and
a brake releasing part configured to drive the first and second rotating members against an urging force of the urging member so that the first and second brake members are moved away from the wheel.

7. The brake unit for the manually-propelled vehicle as claimed in claim 6, wherein the brake releasing part comprises:
a state detection part configured to detect that the manually-propelled vehicle is not in a normal use state so as to output a detection signal;
a control part configured to output a control signal based on the detection signal output from the state detection part; and
a driving part configured to move the first and second brake members away from the wheel based on the control signal output from the control part.

* * * * *